(12) United States Patent
Satou et al.

(10) Patent No.: US 6,926,852 B2
(45) Date of Patent: Aug. 9, 2005

(54) CELL PLATE STRUCTURE FOR SOLID ELECTROLYTE FUEL CELL, SOLID ELECTROLYTE FUEL CELL AND RELATED MANUFACTURING METHOD

(75) Inventors: Fuminori Satou, Kanagawa-ken (JP); Mitsugu Yamanaka, Kanagawa-ken (JP); Makoto Uchiyama, Kanagawa-ken (JP); Masaharu Hatano, Kanagawa-ken (JP); Keiko Kushibiki, Kanagawa-ken (JP); Naoki Hara, Kanagawa-ken (JP); Tatsuhiro Fukuzawa, Kanagawa-ken (JP); Itaru Shibata, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 261 days.

(21) Appl. No.: 10/216,237

(22) Filed: Aug. 12, 2002

(65) Prior Publication Data

US 2003/0031910 A1 Feb. 13, 2003

(30) Foreign Application Priority Data

Aug. 13, 2001 (JP) ..................................... P2001-245721

(51) Int. Cl.$^7$ ................................................ H01M 4/88
(52) U.S. Cl. ............................ 264/42; 264/44; 502/101
(58) Field of Search ....................... 429/30, 45; 264/42, 264/43, 44; 502/101

(56) References Cited

U.S. PATENT DOCUMENTS

| | | | | |
|---|---|---|---|---|
| 5,453,330 A | * | 9/1995 | Kawasaki et al. | 429/30 |
| 5,932,368 A | * | 8/1999 | Batawi et al. | 429/30 |
| 6,051,173 A | * | 4/2000 | Fasano et al. | 264/44 |
| 6,051,329 A | * | 4/2000 | Fasano et al. | 429/30 |
| 2002/0149128 A1 | * | 10/2002 | DiChiara, Jr. | 264/44 |

FOREIGN PATENT DOCUMENTS

JP  8-64216  3/1996  ............ H01M/8/02

* cited by examiner

Primary Examiner—Stephen J. Kalafut
(74) Attorney, Agent, or Firm—McDermott Will & Emery LLP

(57) ABSTRACT

A cell plate structure for a solid oxide electrolyte type fuel cell is provided with a lower electrode layer, an upper electrode layer provided in opposition to the lower electrode layer, a solid electrolyte layer provided between the lower electrode layer and the upper electrode layer, and an area provided in at least one of the lower electrode layer and the upper electrode layer. The area has a portion which is formed by removing a substance, contained in the at least one of the lower electrode layer and the upper electrode layer during formation thereof, after the at least one of the lower electrode layer and the upper electrode layer has been formed. Such a fuel cell plate structure can be applied to a solid electrolyte fuel cell representatively by being disposed between a pair of separators that have gas flow passages supplying the lower electrode layer and the upper electrode layer with gasses, respectively.

17 Claims, 14 Drawing Sheets

FIG.11A
FIG.11B
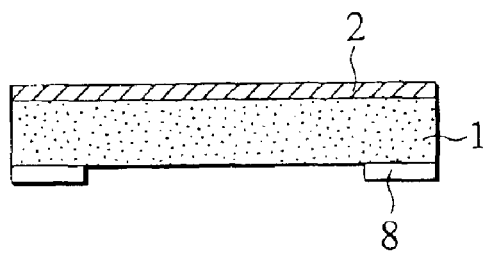
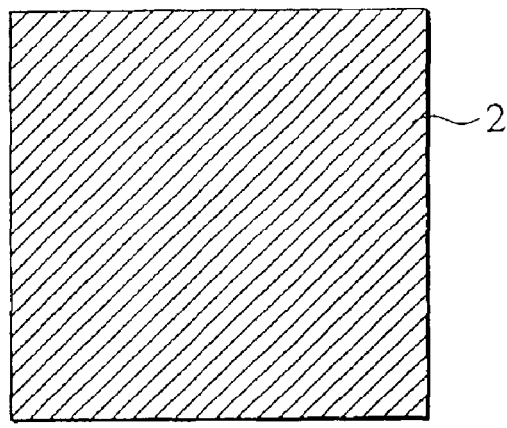
FIG.11C
FIG.11D
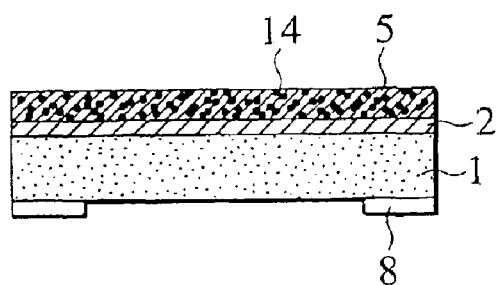
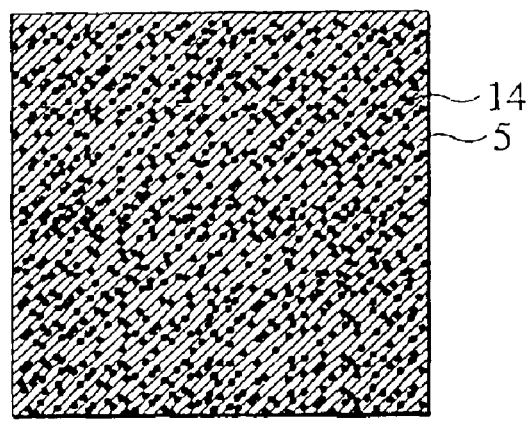
FIG.11E
FIG.11F
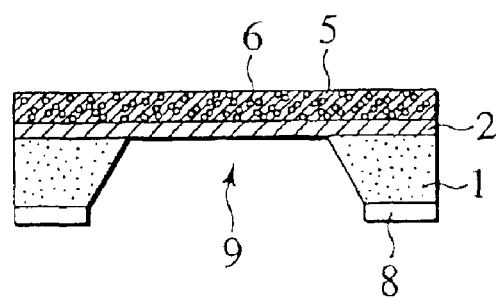
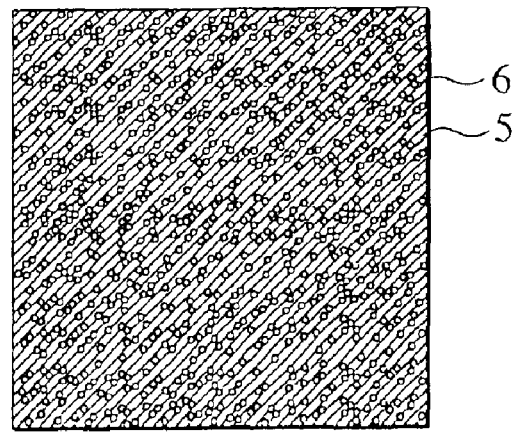

CELL PLATE STRUCTURE FOR SOLID ELECTROLYTE FUEL CELL, SOLID ELECTROLYTE FUEL CELL AND RELATED MANUFACTURING METHOD

BACKGROUND OF THE INVENTION

The present invention relates to a cell plate structure for a solid electrolyte fuel cell, a solid electrolyte fuel cell and a related manufacturing method thereof and, more particularly, to a cell plate structure for a solid electrolyte fuel cell, which uses a solid electrolyte to obtain electrical energy due to an electro-chemical reaction, a solid electrolyte fuel cell using such a cell plate structure and a related manufacturing method thereof.

In recent years, a great attention has heretofore been focused on fuel cells as clean energy sources that generate electric power output at a high energy conversion efficiency to be friendly in an earth environment.

Among these fuel cells, a solid oxide electrolyte type fuel cell (solid oxide fuel cell: hereinafter referred to as SOFC) employs electrolyte composed of an oxide ion conductivity type solid electrolyte such as yttria-stabilized zirconia.

In such an SOFC, it is proposed that both surfaces (front and rear surfaces) of the electrolyte layer are formed with porous electrodes to allow the solid electrolyte to serve as a partition wall wherein one electrode is supplied with fuel gas such as hydrogen or hydrocarbon and the other electrode is supplied with oxidizing gas such as air or oxygen to permit the fuel cell to generally operate at a temperature about 1000° C. for obtaining electrical energy.

Further, it is known that the solid electrolyte of such an SOFC has an electrical conductivity, lower than that of the electrolyte of a phosphoric acid type fuel cell or a molten carbonate type fuel cell approximately by one digit number. In general, electrical resistance of the electrolyte portion forms a loss in electric power generation output. In order to improve an electric power generating output density, it is important for the solid electrolyte to be formed in a thin film to have a film resistance with a value as low as possible. On the other hand, it is required for the electrolyte layer to have a surface area greater in value to some extent in order to enhance various functions of the fuel cell and, hence, the SOFC employs a cell structure (unit cell structure) wherein the electrolyte layer is formed on a supporting member having a mechanical strength.

Japanese Patent Application Laid-Open Publication No. H8-64216 discloses a fuel cell that attempts to form an electrolyte layer in a thin film and, more particularly, discloses a structure wherein a supporting substrate is formed with a large number of small opening portions each of which accommodates the cell plate structure structured to have a fuel electrode layer, an electrolyte layer and an air electrode layer deposited in three film layers, and a separator plate formed with flow passages, with the cell plate and the separator plate being alternately laminated. With such a structure, it is possible to use a non-porous silicon (Si) wafer as a supporting substrate which is formed with various elementary layers in film shapes, providing a capability of forming the electrolyte layer with a thickness in the order of approximately 2 μm. In particular, an electrolyte layer composed of stabilized zirconia formed in a single crystal film is formed on a Si substrate or a Si substrate formed with an oriented cerium oxide ($CeO_2$) thereon.

SUMMARY OF THE INVENTION

Upon careful studies conducted by the present inventors, in order to improve the electric power output density, it is certainly required for the electrolyte portion to be formed in the thin film so as to lower the electrical conductivity of the electrolyte portion and, on the other hand, it is important for the electrolyte layer to ensure an adequate dense property because the SOFC internally has the electrolyte layer as the partition wall for fuel gas and air. For instance, the presence of a leakage of fuel gas and air even in a small amount due to a pin hole formed in the electrolyte layer causes such gases to directly react with one another, resulting in a loss of electric power generating output. From such viewpoints, even in the presence of the non-porous supporting substrate or the porous supporting substrate, it is importantly conceivable that the supporting substrate is formed with a dense electrolyte film.

Upon a further study of a detail of the structure disclosed in Japanese Patent Application Laid-Open Publication No. H8-64216, such a structure concerns a feature wherein the electrolyte layer is formed on the substrate having an excellent flatness with non-porous property and has a dense thin film in the order of less than several micrometers. Another feature resides in that the electrolyte layer and both electrode layers are entirely formed on a single sheet of Si substrate having a large number of small opening portions and the electrolyte film is directly formed on the Si substrate in a single crystal film after removal of oxide film from the Si substrate.

Thus, as the film resistance decreases due to formation of the electrolyte layer in the thin film shape, there is a change from a rate-determining process in a cell reaction depending on an oxygen ion conductivity within the electrolyte layer to a rate-determining process in a decomposing ionizing reaction of oxygen molecules or oxidizing reaction of fuel gas molecules at the electrode surface, or a rate-determining process in a cell reaction depending on capabilities in which the oxygen molecules or fuel gas molecules are supplied to a so-called reaction interface.

For this reason, to increase the electric power output, there is a need for each gas to be sufficiently supplied to the reaction interface while enhancing a sufficient electrode reaction surface area.

However, with such a structure disclosed in Japanese Patent Application Laid-Open Publication No. H8-64216, in order for the electrolyte layer to be formed in a thin film with a sufficient density, the lower electrode layer must be formed in a high flatness. The use of such a structure wherein the electrolyte layer is formed on the lower electrode layer having the high flatness results in an inability in enhancing adequate surface areas in the reaction interfaces related to the three phases involving the electrolyte layer and the both electrode layers, at which an actual cell reaction takes place, and reaction gases such as air and fuel gas. It is also experienced that the reacting gas is supplied to the interface between the lower electrode layer and the electrolyte layer behind the dense electrode layer having the high flatness, i.e. behind the lower electrode layer. Thus, a difficulty is encountered in supplying sufficient amounts of reacting gases necessary for reaction.

The present invention has been completed upon considerable research and development work conducted by the present inventors, in view of the above studies, based on a newly obtained knowledge as to such a step in which especially, when forming at least one of electrode layers, a substance to be removed in a post-treatment is contained in the at least one of electrode layers and then the included substance is removed from the at least one of electrolyte layers in the post-treatment. It is therefore an object of the present invention to provide a cell plate structure for an SOFC (hereinafter preferably referred to as SOFC cell plate structure as the case may be), an SOFC and a manufacturing method thereof wherein, while forming a thin electrolyte layer on a dense and flat electrode layer, the electrode layer is treated to form pores or the like therein to provide a porous property such that the electrode layer has a small film resistance and a large electrode reaction interface to allow the electrode reaction interface to be supplied with sufficient amount of reacting gas for thereby providing a capability of realizing a high operating efficiency as well as a high power output density.

According to one aspect of the present invention, there is provided a cell plate structure for an SOFC, comprises: a lower electrode layer; an upper electrode layer provided in opposition to the lower electrode layer; a solid electrolyte layer provided between the lower electrode layer and the upper electrode layer; and an area provided in at least one of the lower electrode layer and the upper electrode layer. The area has a portion which is formed by removing a substance, contained in the at least one of the lower electrode layer and the upper electrode layer during formation thereof, after the at least one of the lower electrode layer and the upper electrode layer has been formed.

Besides, in the present invention, a method of manufacturing a cell plate structure for an SOFC, comprises: forming a lower electrode layer; forming an upper electrode layer, the lower electrode layer and the upper electrode layer being provided in opposition to the lower electrode layer; forming a solid electrolyte layer, which is provided between the lower electrode layer and the upper electrode layer; allowing a substance to be contained in at least one of the lower electrode layer and the upper electrode layer; and executing a post-treatment by removing the substance, contained in the at least of the lower electrode layer and the upper electrode layer during formation thereof, after the at least one of the lower electrode layer and the upper electrode layer has been formed, to make the at least one of the lower electrode layer and the upper electrode layer porous.

According to another aspect of the present invention, there is provided a cell plate structure for an SOFC, comprises: a cell plate structure; and a pair of separators between which the cell plate structure is provided and which have gas flow passages. The cell plate structure is provided with: a lower electrode layer; an upper electrode layer provided in opposition to the lower electrode layer; a solid electrolyte layer provided between the lower electrode layer and the upper electrode layer; and an area provided in at least one of the lower electrode layer and the upper electrode layer. The area has a portion which is formed by removing a substance, contained in the at least one of the lower electrode layer and the upper electrode layer during formation thereof, after the at least one of the lower electrode layer and the upper electrode layer has been formed. A gas supplied through the gas flow passages is supplied toward the solid electrolyte layer through such a portion.

Other and further features, advantages, and benefits of the present invention will become more apparent from the following description taken in conjunction with the following drawings.

BRIEF DESCRIPTION OF THE DRAWINGS

FIGS. 11A, 11C, 11E, 12A and 12C are cross sectional views principally showing a cell portion of an SOFC cell plate structure of a fifth preferred embodiment according to the present invention for sequentially illustrating a fabrication process of a related method for manufacturing the SOFC cell plate structure.

DETAILED DESCRIPTION OF THE PREFERRED EMBODIMENTS

SOFC cell plate structures, their related manufacturing methods, SOFCs using such cell plate structures and their related manufacturing methods of respective preferred embodiments according to the present invention are suitably described below with reference to the accompanied drawings.

(First Preferred Embodiment)

First, an SOFC cell plate structure, its related manufacturing method, an SOFC using such an SOFC cell plate structure and its related manufacturing method of a first preferred embodiment according to the present invention are successively described below in detail with reference to FIGS. 1A to 5.

Figure 1C:
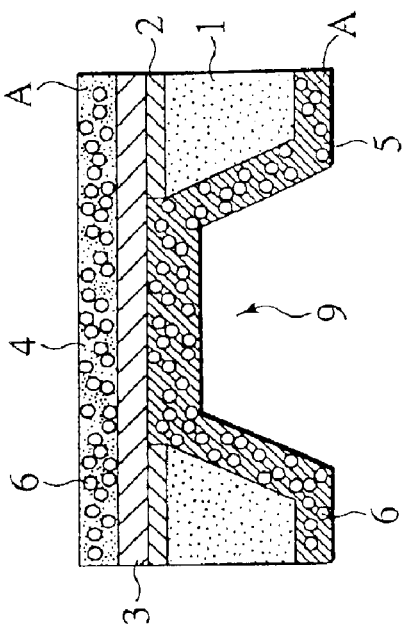
FIG. 1C is an enlarged cross sectional view illustrating a cell portion, shown in FIG. 1B, in an enlarged scale.
Figure 1A:
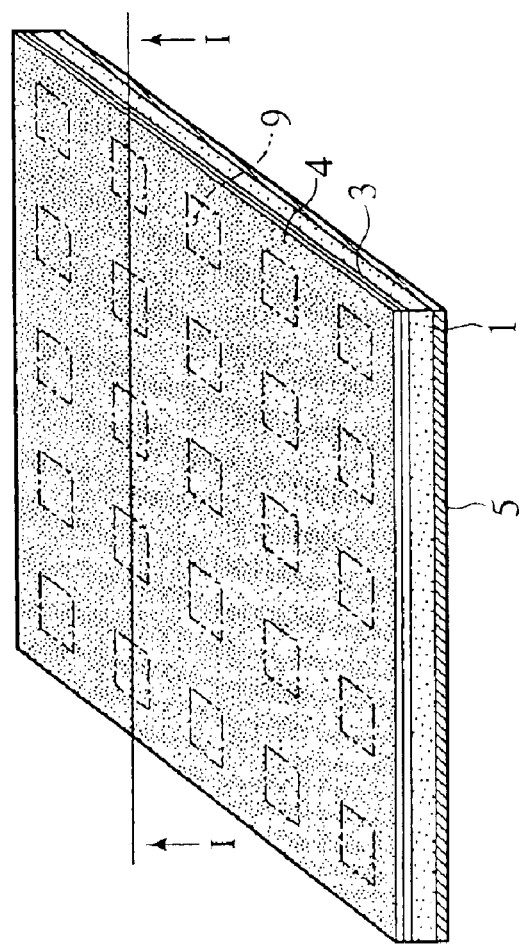
FIG. 1A is a schematic perspective view showing an external structure of an SOFC cell plate structure of a first preferred embodiment according to the present invention.
Figure 1B:
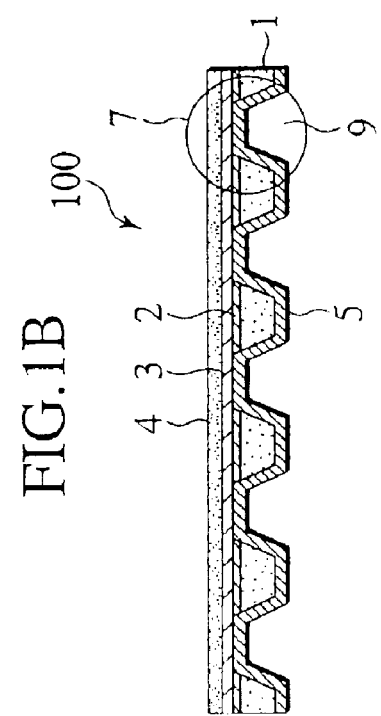
FIG. 1B is a cross sectional view taken on line I—I of FIG. 1A.

FIG. 1A is a schematic perspective view showing an external structure of the SOFC cell plate structure of the preferred embodiment, FIG. 1B is a cross sectional view taken on line I—I of FIG. 1A, and FIG. 1C is an enlarged cross sectional view illustrating a cell portion, shown in FIG. 1B, in an enlarged scale.

As shown in FIGS. 1A to 1C, the SOFC cell plate structure 100 is comprised of a silicon substrate 1 formed in a square shape with the width of 10 cm, with cell portions 7 each having an opening formed in a square shape with the width of approximately 5 mm being formed in 5×5 pieces.

In particular, the silicon substrate 1 has a surface formed with an insulation layer (insulation and stress relaxation layer) 2 and includes five pieces of opening portions 9. In the vicinity of such opening portions 9, the surface of the silicon substrate 1 formed with the insulation layer 2 is formed with an electrolyte layer 3 and an upper electrode layer 4 so as to cover the opening portions 9. A rear surface of the silicon substrate 1 is formed with a lower electrode layer 5 such that a surface of the lower electrode layer 5 is held in direct contact with a rear surface of the electrolyte layer 3. And, both the upper electrode layer 4 and the lower electrode layer 5 are formed with a large number of pores 6 to have a porous property. In other words, a porous area A is formed as to the upper electrode layer 4 and the lower electrode layer 5. Incidentally, such pores 6 may be called as voids or the like and they may have sizes, profiles and distribution enough to allow reacting gas to be supplied to a so-called reaction interface.

Hereinafter, a related fabrication process of the manufacturing method of the SOFC cell plate structure according to the preferred embodiment is described with reference to FIGS. 2A to 3F.

FIGS. 2A, 2C, 2E, 3A, 3C and 3E are cross sectional views for principally showing the cell portion 7 of the SOFC cell plate structure 100 to sequentially illustrate such a fabrication process, and FIGS. 2B, 2D, 2F, 3B, 3D and 3F are plan views corresponding to FIGS. 2B, 2D, 2F, 3B, 3D and 3F, respectively.

Figure 2A:
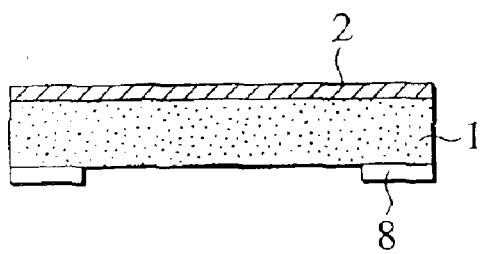
FIGS. 2A, 2C, 2E, 3A, 3C and 3E are cross sectional views for principally showing the cell portion of the SOFC cell plate structure to sequentially illustrate a fabrication process of a related method for manufacturing the SOFC cell plate structure.
Figure 2B:
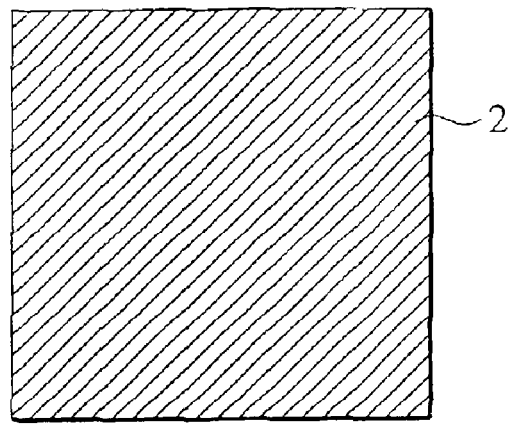
FIGS. 2B, 2D, 2F, 3B, 3D and 3F are plan views corresponding to FIGS. 2B, 2D, 2F, 3B, 3D and 3F, respectively, in the preferred embodiment.

First, as shown in FIGS. 2A and 2B, both surfaces at front and rear sides of the silicon substrate 1 are formed with silicon nitride layers to have a thickness in the order of approximately 2000 Å by a reduced pressure CVD method, the layer at the front surface of which is used as the insulation layer 2. On the other hand, at the rear surface of the silicon substrate 1, by applying a photo-lithography method and a chemical dry etching method using $CF_4$ and $O_2$, a desired patterned area of the silicon nitride layer formed on an entire area of the rear surface is subjected to exposure of light and then, the exposed, patterned area is removed, thereby forming a mask layer 8 that functions as a mask during a silicon etching step which will be described below in conjunction with the next fabrication step.

Figure 2C:
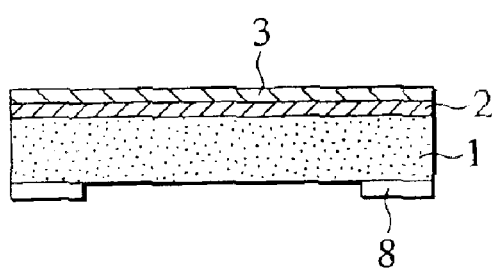
Figure 2D:
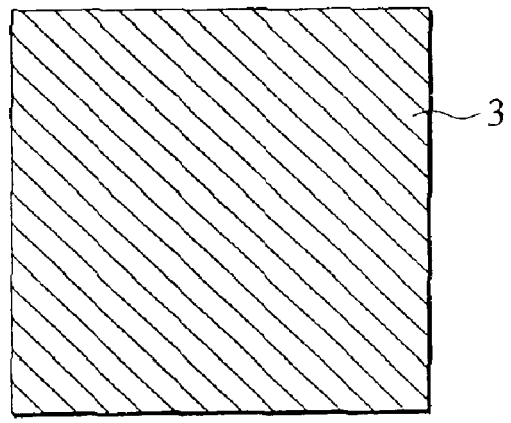

In a subsequent step, as shown in FIGS. 2C and 2D, the electrolyte layer 3 made of yttria stabilized zirconia (hereinafter referred to as YSZ) is deposited onto the insulation layer 2 with a thickness of approximately 2 μm by an RF sputtering method.

Figure 2E:
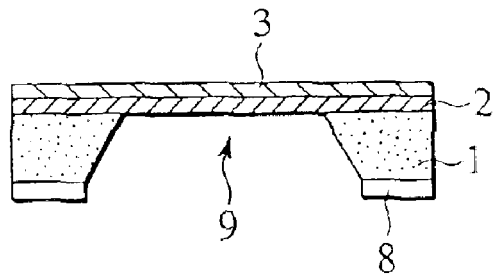
Figure 2F:
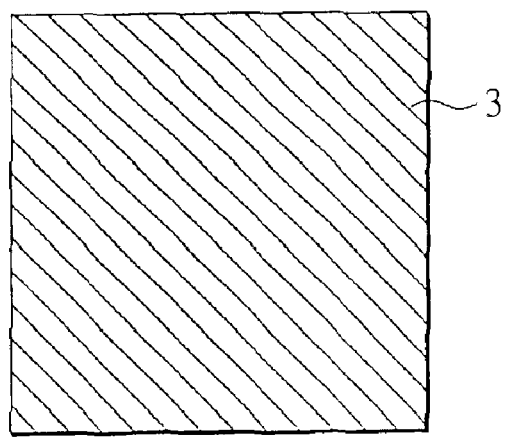

In a consecutive step shown in FIGS. 2E and 2F, the silicon etching step is conducted at a temperature of approximately 80° C. using hydrazine, presenting a strong alkaline property, as silicon etching liquid to etch the silicon substrate 1, forming a substrate opening portion 9 at the rear surface side of the silicon substrate 1. Here, the surface side of the silicon substrate 1 is formed with a so-called diaphragm composed of the insulation layer 2 made of the silicon nitride film and the electrolyte layer 3 made of YSZ.

Figure 3A:
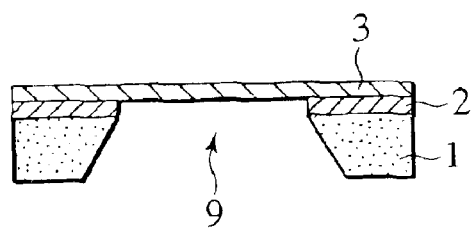
Figure 3B:
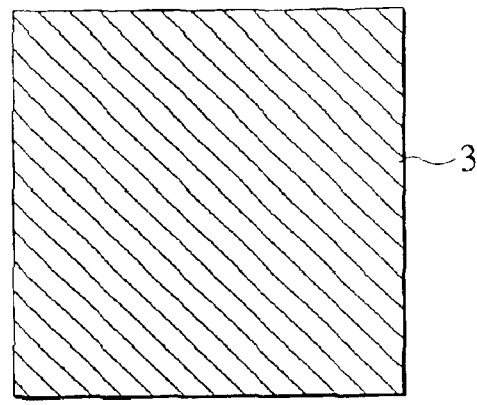

Next, as shown in FIGS. 3A and 3B, the rear surface side of the silicon substrate 1 is subjected to a chemical dry etching method using $CF_4$ and $O_2$, thereby allowing the insulation layer 2, forming part of such diaphragm, and the mask layer 8 to be removed.

Figure 3C:
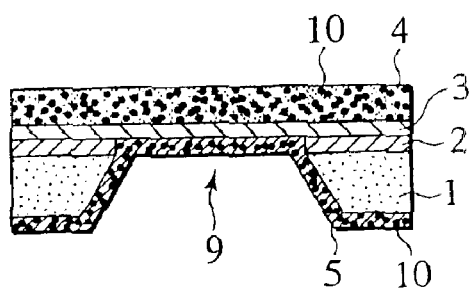
Figure 3D:
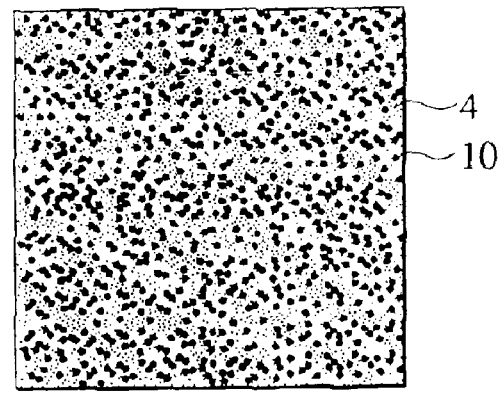

Subsequently, as shown in FIGS. 3C and 3D, the upper electrode layer 4 is formed on the surface of the silicon substrate 1 in a film of $(La_{1-x}Sr_x)CoO_{3-\delta}$ (hereinafter referred to as LSC) with a thickness in a range of approximately 500 nm so as to cover the electrolyte layer 3 by an RF sputtering method with the use of a deposition mask corresponding to a size of the electrolyte layer 3. On the other hand, the lower electrode layer 5 is formed on the rear surface of the silicon substrate 1 in a film of a cermet made of YSZ—NiO with a thickness in a range of approximately 500 nm so as to be held in contact with the rear surface of the electrolyte layer 3 by an RF sputtering method. When conducting such an RF sputtering method, the addition of carbon in both targets for the RF sputtering enables both the resulting upper electrode layer 4 and lower electrode layer 5 formed in the film shapes to contain carbon particles 10.

Figure 3E:
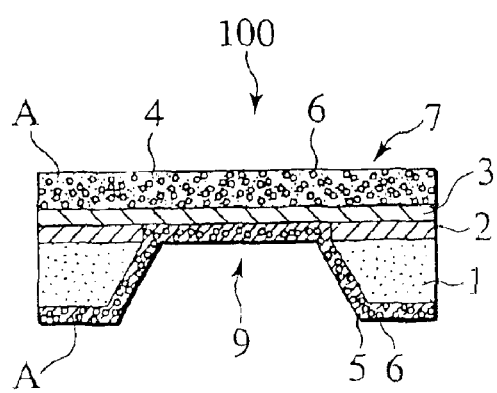
Figure 3F:
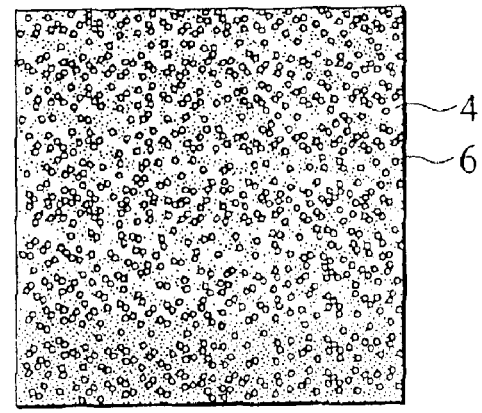

In a consecutive step, as shown in FIGS. 3E and 3F, a heat treatment is carried out at a temperature of approximately 1000° C. in an atmosphere that causes oxidation of carbon to a sufficient extent or in an oxygen containing circumstance for compelling the carbon compounds to be oxidized to initiate gasification as $CO_2$, resulting in the formation of a large number of pores 6 both in the upper electrode layer 4 and the lower electrode layer 5. Thus, it is possible for the SOFC cell plate structure 100 to be made of the cell portions 7 with a structure wherein the upper electrode layer 4 and the lower electrode layer 5 have respective insides formed with the pores 6 to present porous properties and wherein the lower electrode layer 5, the electrolyte layer 3 and the upper electrode layer 4 are sequentially formed on the surface side of the silicon substrate 1 in three layers.

Now, the manufacturing method for the SOFC (unit cell) of the preferred embodiment is described in conjunction with FIGS. 4A to 5B.

Figure 4A:
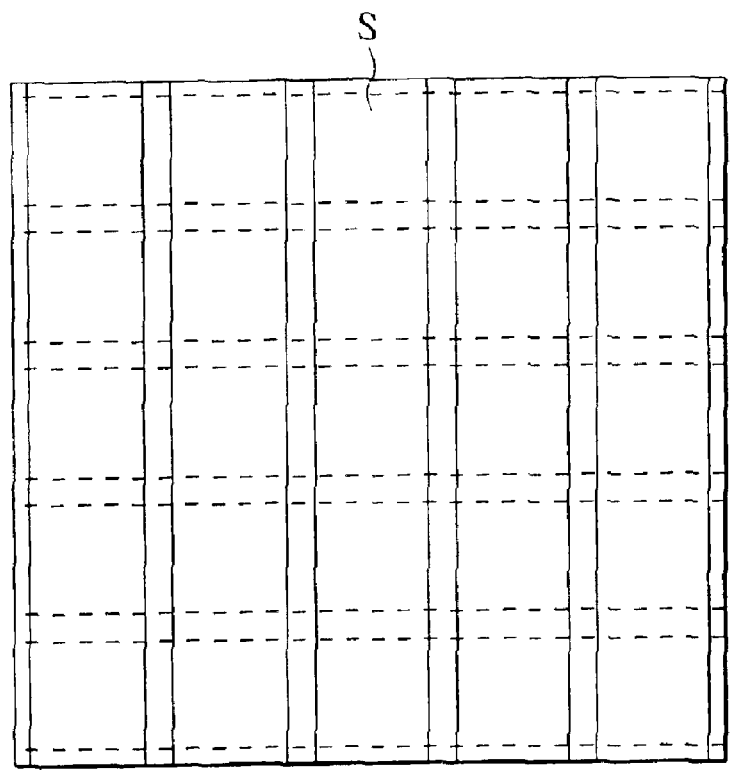
FIG. 4A is a plan view illustrating a separator for the SOFC using the SOFC cell plate structure.
Figure 4B:
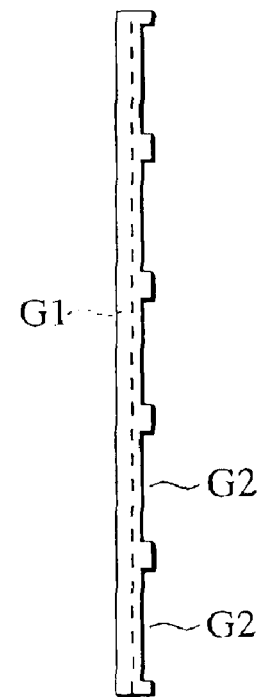
FIG. 4B is an end view as viewed from a side of FIG. 4A.
Figure 4C:
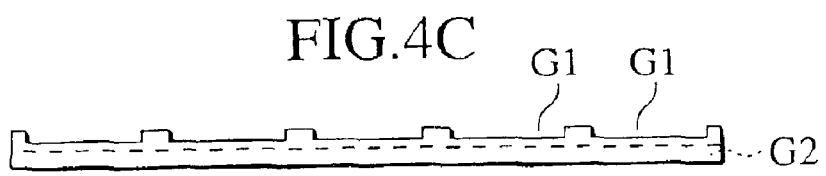
FIG. 4C is an end view as viewed from a front of FIG. 4A, in the preferred embodiment.

FIG. 4A is a plan view illustrating a separator, FIG. 4B is an end view as viewed from a side of FIG. 4A, and FIG. 4C is an end view as viewed from a front of FIG. 4A.

As shown in FIGS. 4A to 4C, initially, the separator S is prepared. While the separator S serves to allow the SOFC cell plate structures 100, formed in a manner set forth above, to be suitably stacked in a fuel cell stack, a description will be given to a structure of the unit cell for a convenience of simplification in description. The separator S includes a silicon plate in a rectangular shape with the width of 10 cm, with both surfaces being formed with gas flow passages G1 and G2 by cutting operations using a dicing saw. Also, the gas flow passages G1 and G2 extend so as to intersect with respect to one another in a so-called cross-flow type.

Figure 5A:
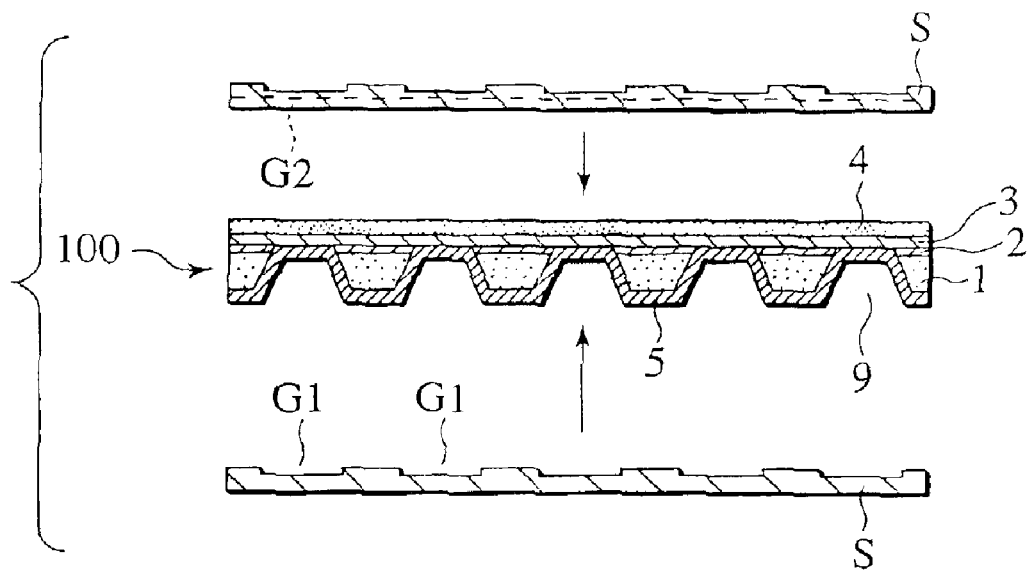
FIG. 5A is an exploded cross sectional view illustrating a process for placing a pair of the above separators to the SOFC cell plate structure for thereby fabricating the SOFC.

Subsequently, as shown in FIG. 5A, two sheets of separators S are placed to be opposed to one another, between which the SOFC cell plate structure 100 is disposed to allow the upper separator S to be adhered to the upper electrode layer 4 of the SOFC cell plate structure 100 and the lower separator S to be adhered to the lower electrode layer 5. Also, electrical conductivities are enhanced between the upper separator S and the upper electrode layer 4 of the SOFC cell plate structure 100 and between the lower separator S and the lower electrode layer 5 of the SOFC cell plate structure 100, respectively.

Figure 5B:
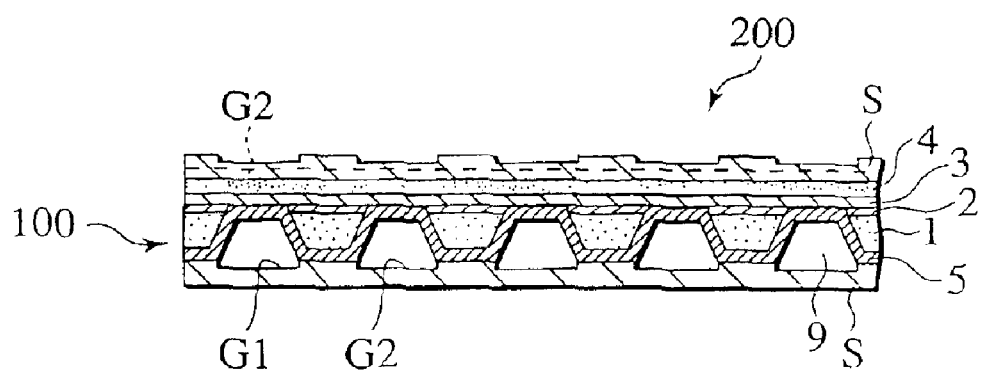
FIG. 5B is an assembled cross sectional view of the SOFC, in the preferred embodiment.

And, finally as shown in FIG. 5B, the unit cell 200 is fabricated to form a unitary structure wherein the unit cell is caught between the upper and lower separators S, S.

The unit cell 200, fabricated in such a way as set forth above, is placed in an electric furnace at a furnace temperature of 700° C. Then, oxygen gas is supplied to the upper electrode layer 4 via the gas flow passages G2 of the upper separators S and hydrogen gas is supplied to the lower electrode layer 5 via the gas flow passages G1 of the lower separator S, with evaluation of an electric power generating characteristic of the unit cell being conducted. Upon evaluation, an open-circuit voltage appeared between the upper and lower separators S, S was 0.95V with a resulting maximum power output being 0.2 W/cm$^2$.

As described above, according to the preferred embodiment of the present invention, since an extremely flat silicon substrate 1 is used and an extremely dense silicon nitride film is formed on such an extremely flat silicon substrate 1 as the insulation layer 2 on which the electrolyte layer 3 is formed, the electrolyte layer 3 tends to have a defect-free thin film with a remarkably excellent film quality, with a resultant decrease in resistance in oxygen ion transference inside the electrolyte layer 3 that would otherwise causes deterioration in the electric power generating characteristic.

Conversely, in such a case, decomposing ionization reaction of oxygen molecules at the electrode surface, oxidizing reaction of oxygen gas or the supply of oxygen molecules and fuel gas to the reaction interfaces form a cause of a rate-determining condition. However, since the preferred embodiment contemplates the addition of carbon to the target of the sputtering during formation of each of the upper electrode layer 4 and the lower electrode layer 5 by sputtering, carbon is temporarily contained in the upper electrode layer 4 and the lower electrode layer 5 and a subsequent oxidizing operation causes carbon to be oxidized and gasified such that the upper electrode layer 4 and the lower electrode layer 5 become porous with the large number of pores 6. As a consequence, the reacting gases can be supplied to the reaction interfaces defined by the upper electrode layer 4, the electrolyte 3 and the lower electrode layer 5 in an extremely preferable fashion in comparison with a case in which the reacting gases is supplied only through grain boundaries of the electrodes. In addition, effective surface areas of the reaction interfaces as to three phases of the electrolyte layer, the electrode layer and the reacting gases is remarkably increased, with a resultant significant increase in the electric power generating efficiency.

Accordingly, due to one aspect of the preferred embodiment, the addition of carbon in the target of each of the electrode materials enables the upper electrode layer 4 and the lower electrode layer 5 to contain carbon particles once and the addition of the simple step of conducting the heat treatment in the oxidizing atmosphere enables the formation of the dense and desirable electrolyte layer 3 to be compatible with the formation of the porous upper electrode layer 4 and the porous lower electrode layer 5, thereby providing an excellent advantage in that the electric power generating efficiency is remarkably improved.

Also, while the preferred embodiment has been described above in conjunction with the example wherein the upper electrode layer 4 and the lower electrode layer 5 are formed in the film shapes with the use of the sputtering method employing each target added with carbon in electrode material, the present invention is not limited thereto and it may be possible to adopt other film forming methods involving a co-sputtering method using dual targets one of which is an electrode material and the other of which is a material including carbon, a PVD method such as a vapor deposition method, an ion plating method and a laser abrasion method, a thermal spraying method, a paste coating method and a sol-gel method.

Further, while the preferred embodiment has been exemplarily discussed above with reference to carbon as material to be temporarily contained in the upper electrode layer 4 and the lower electrode layer 5, the present invention is not limited to carbon and may employ other substances, provided that such materials are oxidized and gasified due to a heat treatment in an oxidizing atmosphere, such as molybdenum, molybdenum compounds, tungsten and tungsten compounds.

Furthermore, for the substances to be contained in the upper electrode layer 4 and the lower electrode layer 5 once, it is not objectionable to use substances that can be gasified and removed by conducting a plasma treatment. In such a case, a post-treatment may involve a plasma treatment using $CF_4$ and $O_2$, with substances to be contained including silicon, silicon nitride, molybdenum silicide, tungsten silicide, titanium, titanium nitride and titanium oxide that can be gasified and removed. Also, it is not objectionable for a post-treatment to involve a plasma treatment using $CF_4$ and $H_2$, with substances to be contained including silicon oxide.

Moreover, it is not objectionable for other substances to be contained in the upper electrode layer 4 and the lower electrode layer 5 once, such as one that is dissolved by a liquid treatment. For example, hydrogen fluoride solution or strong alkaline solution may be used. In a case of conducting a post-treatment using the hydrogen fluoride solution, the substance to be contained in the electrode layers may include silicon oxide that can be dissolved and removed by the hydrogen fluoride solution. In the mean time, in a case of conducting a post-treatment using the strong alkaline solution, the substance to be contained in the electrode layers may include silicon that can be dissolved and removed by the strong alkaline solution.

Further, in a case where an inclusion substance that grows up in crystalline during a heat treatment is used as material to be contained once in the upper electrode layer 4 and the lower electrode layer 5, it may be possible for a heat treatment to be conducted in a non-oxidizing atmosphere to grow up crystalline particles prior to conducting a heat treatment in an oxidizing atmosphere as a post-treatment, with the size of the pores 6 being controlled in the post-treatment.

Furthermore, the present invention is not limited to particular sizes of the silicon substrate 1 and the film thickness of the layers to be formed and may take the form of any other dimensions if desired, with the number of cell portions 7 to be incorporated in the cell plate structure or fuel cell being not limited to a particular number of pieces.

In addition, the present invention is not limited to particular materials of other component parts of the SOFC of the preferred embodiment. For instance, the electrolyte layer 3 may be composed of other material that has oxygen ion transfer property, the upper electrode layer 4 may be composed of other material such as lanthanum-strontium-manganese oxide (LSM), and the lower electrode material 5 may be composed of other material such as nickel or platinum.

(Second Preferred Embodiment)

Now, an SOFC cell plate structure, its related manufacturing method, an SOFC using such an SOFC cell plate structure and its related manufacturing method of a second preferred embodiment according to the present invention are described below in detail with reference to FIGS. 6A to 7D.

Fundamentally, since the second preferred embodiment has the same structure as the first preferred embodiment except for that all of the lower electrode layer 5, the electrolyte layer 3 and the upper electrode layer 4 are preliminarily laminated on the diaphragm composed of the silicon nitride film serving as the insulation layer 2, the layers of component part of the SOFC are laminated in a different order, with a substance to be contained in the upper electrode layer 4 and the lower electrode layer 5 once and arranged to contain silicon nitride that is different from the substance to be contained once in the electrode layers of the first preferred embodiment. Consequently, the second preferred embodiment is described in a suitably simplified manner with such differential points being focused, with like component parts bearing the same reference numerals as those used in the first preferred embodiment.

FIGS. 6A, 6C, 6E, 7A and 7C are cross sectional views principally showing a cell portion 7 of an SOFC cell plate structure 100 for sequentially illustrating a fabrication process of the manufacturing method of the SOFC cell plate structure of the presently filed preferred embodiment, and FIGS. 6B, 6D, 6F, 7B and 7D are plan views corresponding to FIGS. 6A, 6C, 6E, 7A and 7C, respectively.

Figure 6A:
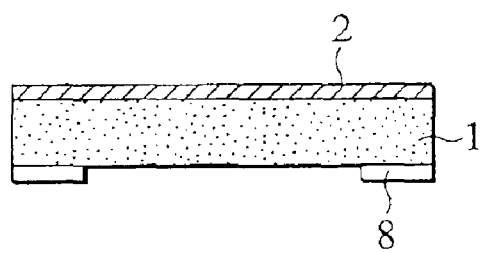
FIGS. 6A, 6C, 6E, 7A and 7C are cross sectional views principally showing a cell portion of an SOFC cell plate structure of a second preferred embodiment according to the present invention for sequentially illustrating a fabrication process of a related method for manufacturing the SOFC cell plate structure.
Figure 6B:
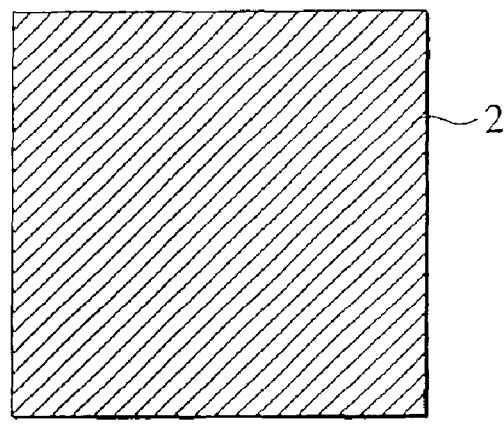
FIGS. 6B, 6D, 6F, 7B and 7D are plan views corresponding to FIGS. 6A, 6C, 6E, 7A and 7C, respectively.

First, as shown in FIGS. 6A and 6B, a silicon nitride film is formed on a surface of a silicon substrate 1 to have a thickness in the order of approximately 2000 Å by a reduced pressure CVD method, thereby forming an insulation layer 2. On the other hand, simultaneously, a rear surface of the silicon substrate 1 is formed with a silicon nitride film, that serves as a mask layer 8 during a silicon etching step as will be described later, with a thickness in the order of approximately 2000Å by a reduced pressure CVD method. Further, at the rear surface side of the silicon substrate 1, by applying a photo-lithography method and a chemical dry etching method using $CF_4$ and $O_2$, a desired area of the silicon nitride film is exposed to light and, then, the exposed area is removed, thereby completing the mask layer 8.

Figure 6C:
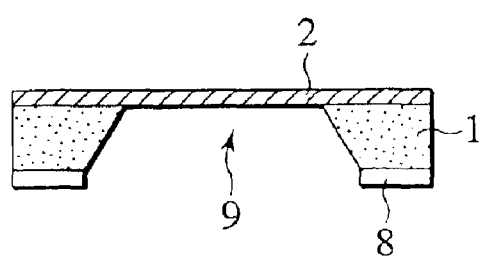
Figure 6D:
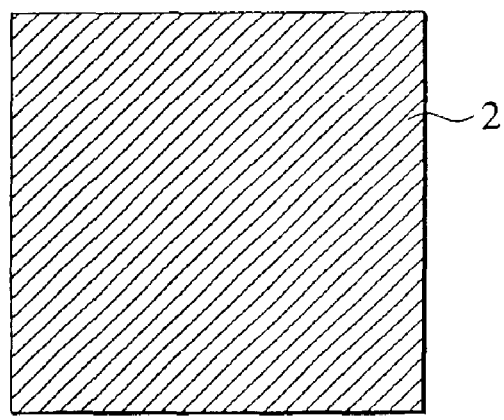

Next, as shown in FIGS. 6C and 6D, the silicon etching step is conducted at a temperature of approximately 80° C. using hydrazine as silicon etching liquid, forming a substrate opening portion 9 at the rear surface of the silicon substrate 1. In such a way, the diaphragm of the insulation film 2 is formed on the front surface of the silicon substrate 1.

Figure 6E:
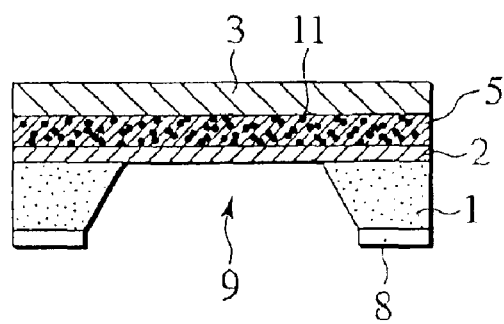
Figure 6F:
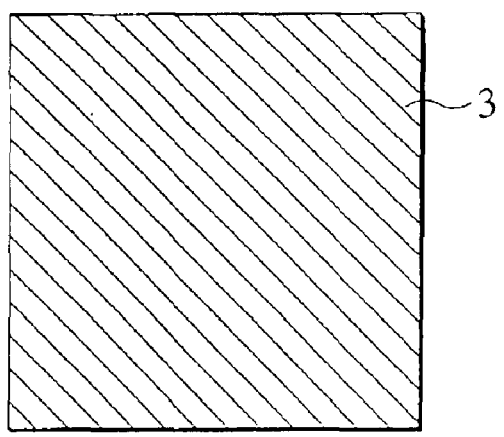

Subsequently, as shown in FIGS. 6E and 6F, the front surface of the silicon substrate 1 is formed with the cermet of YSZ—NiO with a thickness in the order of approximately 500 nm by an RF sputtering method, thereby forming a lower electrode layer 5. In this instance, adding silicon nitride in the target to be sputter deposited allows the lower electrode 5 in the form of the film to contain silicon nitride particles 11. And, an electrolyte layer 3 composed of YSZ is formed on the lower electrode layer 5 and has a thickness of approximately 2 μm by an RF sputtering method.

Figure 7A:
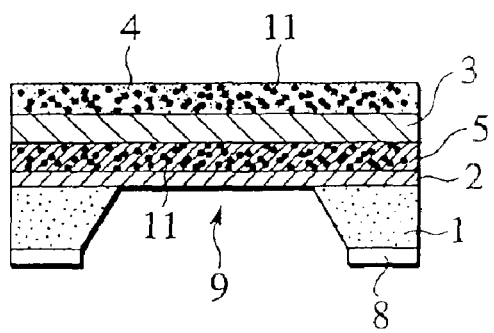
Figure 7B:
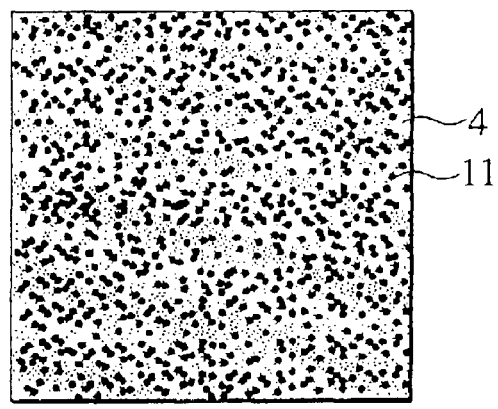

In a consecutive step, as shown in FIGS. 7A and 7B, a film of LSC is formed on the electrolyte layer 3 to have a thickness of approximately 500 nm by an RF sputtering method, with a subsequent formation of an upper electrode layer 4. When forming such upper electrode layer 4, also the addition of silicon nitride in the target to be sputter deposited allows the upper electrode layer 4 to be formed in a film containing silicon nitride particles 11.

Figure 7C:
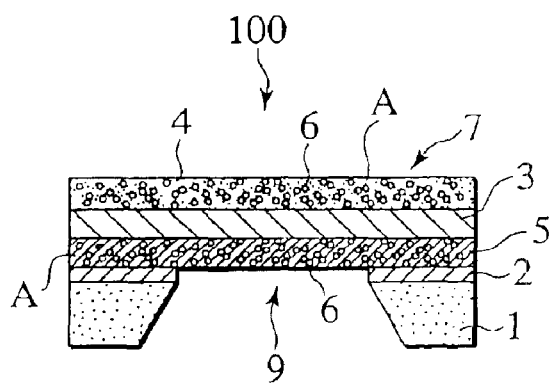
Figure 7D:
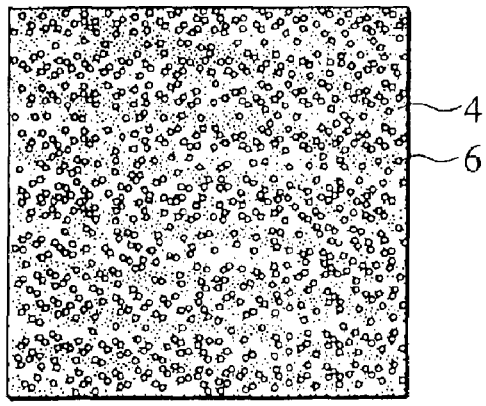

In addition, as shown in FIGS. 7C and 7D, a chemical dry etching method using $CF_4$ and $O_2$ is conducted at the rear surface of the silicone substrate 1, thereby removing the silicon nitride film (insulation layer 2) and the mask layer 8 from the rear surface of the diaphragm portion. And, by presetting the treatment time period needed for such a chemical dry etching to be longer than the etching time period required for the silicon nitride film (insulation layer 2) for removing silicon nitride contained in the upper electrode layer 4 and the lower electrode layer 5, a large number of pores 6 are formed in the upper electrode layer 4 and the lower electrode layer 5. Namely, the upper electrode layer 4 and the lower electrode layer 5 are internally rendered to be porous such that the pores 6 are present, and the SOFC cell plate structure 100 is formed with the cell portions 7 each with a structure composed of three layers involving the lower electrode layer 5, the electrolyte layer 3 and the upper electrode layer 4 which are sequentially laminated on the front surface of the silicon substrate 1.

Using the SOFC cell plate structure 100 obtained in such a way discussed above, an SOFC (unit cell) is prepared in the same manner as the first preferred embodiment to conduct evaluation of the electric power generating efficiency, with a similar result being obtained.

With such a structure of the presently filed preferred embodiment set forth above, preliminarily laminating all of the lower electrode layer 5, the electrolyte layer 3 and the upper electrode layer 4 on the diaphragm of the silicon nitride film and compelling the upper electrode layer 4 and the lower electrode layer 5 to contain silicon nitride that is the substance to be removed by the chemical dry etching method to remove the silicon nitride film provides a capability of forming the pores 6 in the upper electrode layer 4 and the lower electrode layer 5 to reliably have a desired porous quality therein without increasing the number of fabrication steps.

Further, the use of the technology for removing the silicon nitride film (insulation layer 2) by etching after forming the three layers, composed of the lower electrode layer 5, the electrolyte layer 3 and the upper electrode layer 4, on the diaphragm of the silicon nitride film (insulation layer 2) that is extremely strong in structure enables respective layers to be precluded from being damaged in the course of fabrication steps, resulting in an improvement in a production yield and reliability. When this takes place, while the silicon substrate 1 is also etched by the chemical dry etching method with $CF_4$ and $O_2$, the presence of the electrode with the thickness in the order of approximately 500 nm permits the silicon substrate 1 to be correspondingly cut away in a minute amount to preclude the same from being adversely affected in its function.

Furthermore, while, in the second preferred embodiment, silicon nitride is used as the substance to be contained in the upper electrode layer 4 and the lower electrode layer 5, of course, the present invention is not limited to such a substance and may utilize substances that react with and are gasified by plasma of $CF_4$ and $O_2$ during the chemical dry etching method. For instance, these substances may include silicon, molybdenum silicide, tungsten silicide, titanium, titanium nitride and titanium oxide.

Moreover, it is to be appreciated that the upper electrode layer 4 and the lower electrode layer 5 may be similarly formed with the pores 6 to provide the porous properties, respectively, by changing the kind of gases to create plasma during such a chemical dry etching method and by permitting particular substance, to be etched by such plasma, to be contained in the electrodes.

In addition, although an additional step is required separately from the removal of the silicon nitride film, it is of course to be understood that the combination of the post-treatment and the substance to be contained in the same manner as in the first preferred embodiment provides an alternative way of forming the pores 6.

Moreover, in case of using the intrusion substances whose crystalline grows up when in a heat treatment, the heat treatment may be conducted at an appropriate condition once to grow up crystalline particles prior to the post-treatment and, subsequently, the post-treatment may be conducted so as to form the pores 6 in varying sizes.

(Third Preferred Embodiment)

Now, an SOFC cell plate structure, its related manufacturing method, an SOFC using such an SOFC cell plate structure and its related manufacturing method of a third preferred embodiment according to the present invention are described below in order with reference to FIGS. 8A to 8F.

Fundamentally, the third preferred embodiment has the same structure as the first preferred embodiment except for that all of the lower electrode layer 5, the electrolyte layer 3 and the upper electrode layer 4 are laminated on a silicon substrate 1 and subsequently the silicon substrate 1 is etched by silicon etching liquid to form pores 6 in the upper electrode layer 4 and the lower electrode layer 5, and that layers of the component parts of the SOFC are laminated in a different order and the pores 6 of the upper electrode layer 4 and the lower electrode layer 5 are formed in a different step. Consequently, the third preferred embodiment is described below in a suitably simplified manner with such differential points being focused, with like component parts bearing the same reference numerals as those used in the first preferred embodiment.

Figure 8A:
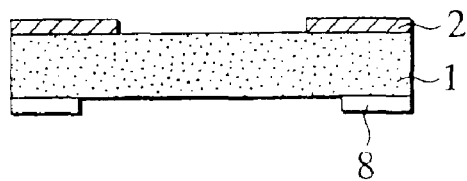
FIGS. 8A, 8C and 8E are cross sectional views principally showing a cell portion of an SOFC cell plate structure of a third preferred embodiment according to the present invention for sequentially illustrating a fabrication process of a related method for manufacturing the SOFC cell plate structure.
Figure 8B:
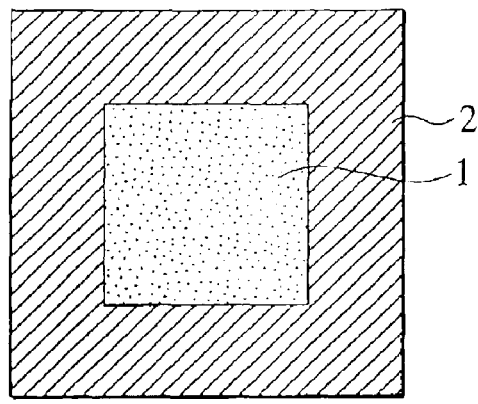
FIGS. 8B, 8D and 8F are plan views corresponding to FIGS. 8A, 8C and 8E, respectively.
Figure 8C:
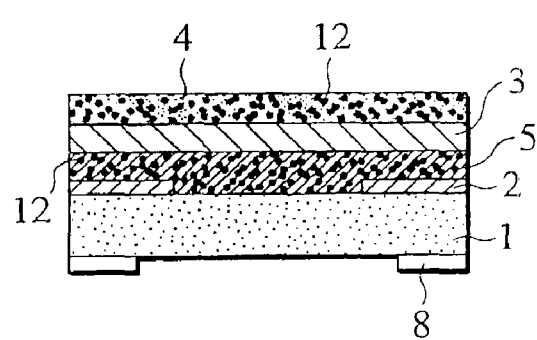
Figure 8D:
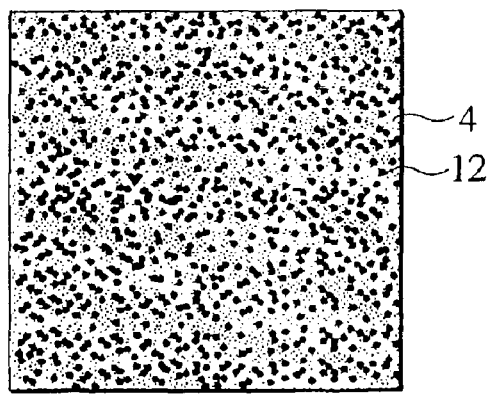
Figure 8E:
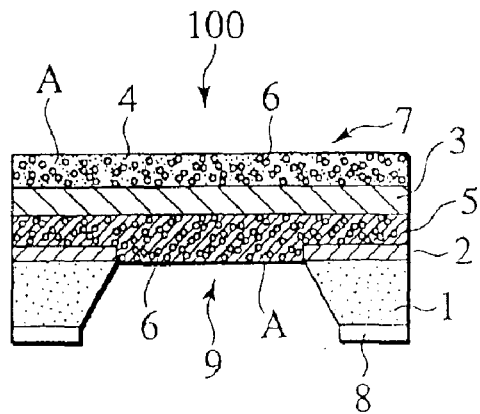
Figure 8F:
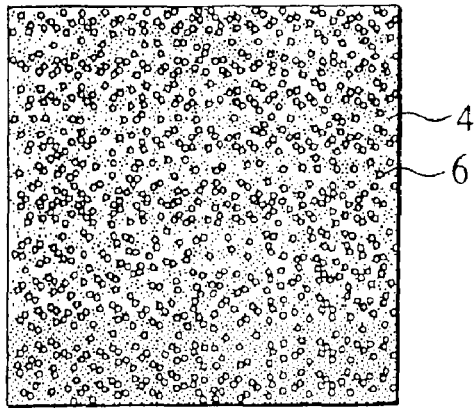

FIGS. 8A, 8C and 8E are cross sectional views principally showing a cell portion 7 of an SOFC cell plate structure 100 for sequentially illustrating a fabrication process of the manufacturing method of the SOFC cell plate structure of the presently filed preferred embodiment, and FIGS. 8B, 8D and 8F are plan views corresponding to FIGS. 8A, 8C and 8E, respectively.

First, as shown in FIGS. 8A and 8B, silicon nitride films are formed on both surfaces of a silicon substrate 1 to have a thickness in the order of approximately 2000 Å by a reduced pressure CVD method, thereby forming an insulation layer 2 on the surface side while forming a mask layer 8 on the rear surface side to allow a silicon etching step as will be described later. Subsequently, by applying a photolithography method and a chemical dry etching method using $CF_4$ and $O_2$, desired areas of the silicon nitride films formed on the surface and the rear surface of the silicon substrate 1 are exposed to light and, then, the exposed areas are removed, thereby forming the insulation layer 2 and the mask layer 8 on front and rear surfaces of the silicon substrate 1 in respective desired patterns.

Subsequently, as shown in FIGS. 8C and 8D, the surface of the silicon substrate 1 is formed with the cermet of YSZ—NiO with a thickness in the order of approximately 500 nm by an RF sputtering method, thereby forming a lower electrode layer 5. In this instance, adding silicon in the target to be sputter deposited allows the lower electrode layer 5 to be formed in a film that contains silicon particles 12.

Next, as similarly shown in FIGS. 8C and 8D, the electrolyte layer 3 composed of YSZ is formed in a film on the lower electrode layer 5 and has a thickness of approximately 2 $\mu$m by an RF sputtering method while a film of LSC is formed on the electrolyte layer 3 as the upper electrode layer 4 with a thickness of approximately 500 nm by an RF sputtering method. When forming such an upper electrode layer 4, also the addition of silicon in the target to be sputter deposited allows the upper electrode layer 4 to be formed in the film containing silicon particles 12.

In a subsequent step, as shown in FIGS. 8E and 8F, the silicon etching step using hydrazine as silicon etching liquid is conducted at the rear surface of the silicone substrate 1 at a temperature of approximately 80° C., thereby forming a substrate opening portion 9. When this takes place, the silicon particles contained in the upper electrode layer 4 and the lower electrode layer 5 are etched at the same time that the silicon substrate 1 is etched with the silicon etching liquid, with a resultant formation of pores 6 in the upper electrode layer 4 and the lower electrode layer 5. Thus, the upper electrode layer 4 and the lower electrode layer 5 are internally rendered porous such that the pores 6 are present, and the SOFC cell plate structure 100 is formed with the cell portions 7 each with a structure composed of three layers involving the lower electrode layer 5, the electrolyte layer 3 and the upper electrode layer 4 which are sequentially laminated on the front surface of the silicon substrate 1.

Using the SOFC cell plate structure 100 obtained in such a way discussed above, an SOFC (unit cell) is prepared in the same manner as the first preferred embodiment to conduct evaluation of the electric power generating efficiency, with a similar result being obtained.

As previously noted above, while the presently filed preferred embodiment concerns a feature of laminating the lower electrode layer 5, the electrolyte layer 3 and the upper electrode layer 4 on the silicon substrate 1 in order and subsequently conducting the etching step of the silicon substrate 1 with the silicon etching liquid, the presence of the upper electrode layer 4 and the lower electrode layer 5 preliminarily containing silicon to be subsequently removed during the silicon etching step provides a capability of forming the pores 6 in the upper electrode layer 4 and the lower electrode layer 5 using the silicon etching step without increasing the number of fabrication steps.

Also, while, in the third preferred embodiment, silicon is used as the substance to be contained in the upper electrode layer 4 and the lower electrode layer 5, of course, the present invention is not limited to such a substance and may utilize other substances that are dissolved with the silicon etching liquid.

In addition, although an additional step is required separately from the etching step, it is of course to be understood that the combination of the post-treatment and the substance to be contained in the same manner as in the first preferred embodiment provides an alternative way of forming the pores 6.

Moreover, using the intrusion substance whose crystalline grows up due to a heat treatment allows the crystalline particles to be grown up once upon the heat treatment at an appropriate condition prior to a post-treatment and, subsequently, the post-treatment may be conducted so as to form the pores 6 in varying sizes.

(Fourth Preferred Embodiment)

Now, an SOFC cell plate structure, its related manufacturing method, an SOFC using such an SOFC cell plate structure and its related manufacturing method of a fourth preferred embodiment according to the present invention are described below in order with reference to FIGS. 9A to 10E.

Fundamentally, the fourth preferred embodiment has the same structure as the first preferred embodiment except for that the lower electrode layer 5 contains a substance to be removed during a silicon etching step for etching the silicon substrate 1 whereby the lower electrode layer 5 is formed with the pores 6 prior to the formation of the electrolyte layer 3, that layers of the component parts of the SOFC are laminated in a different order, that the pores are not formed in the upper electrode layer 4 and that the pores 6 are formed in the lower electrode layer 5 in a different step. Consequently, the fourth preferred embodiment is described below in a suitably simplified manner with such differential points being focused, with like component parts bearing the same reference numerals as those used in the first preferred embodiment.

Figure 9A:
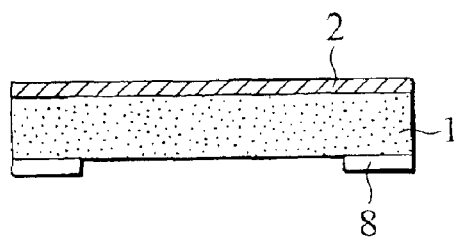
FIGS. 9A, 9C, 9E, 10A and 10C are cross sectional views principally showing a cell portion of an SOFC cell plate structure of a fourth preferred embodiment according to the present invention for sequentially illustrating a fabrication process of a related method for manufacturing the SOFC cell plate structure.
Figure 9B:
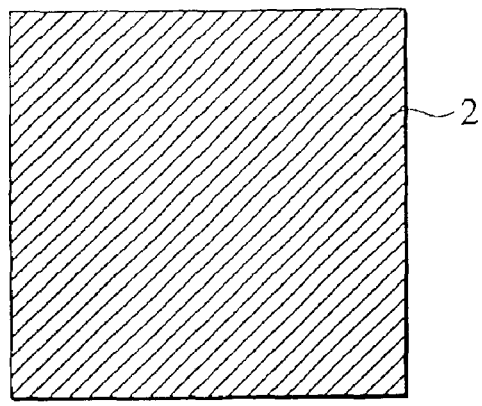
Figure 9C:
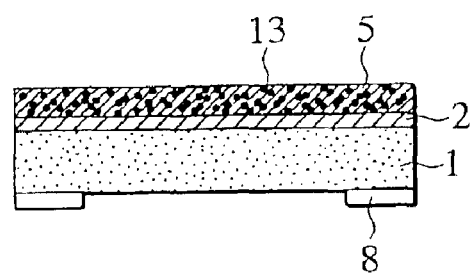
Figure 9D:
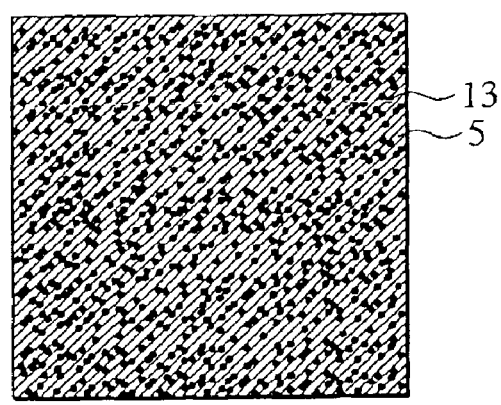
Figure 9E:
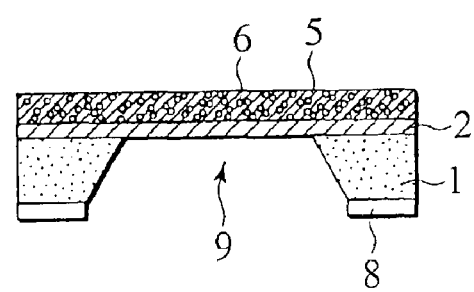
Figure 9F:
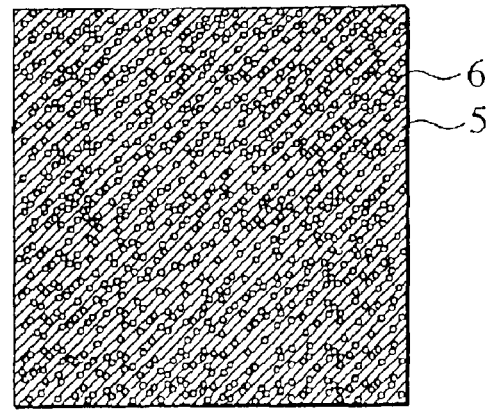
Figure 10A:
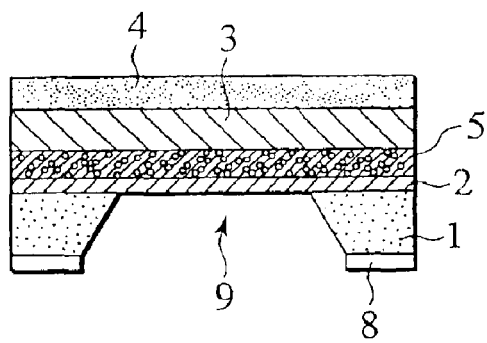
Figure 10B:
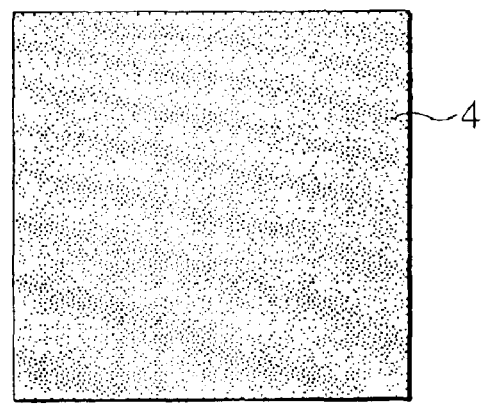
FIG. 10E is an enlarged view of a part of FIG. 10C, and FIGS. 9B, 9D, 9F, 10B and 10D are plan views corresponding to FIGS. 9A, 9C, 9E, 10A and 10C, respectively.
Figure 10C:
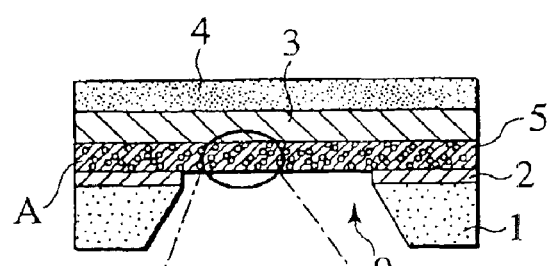
Figure 10D:
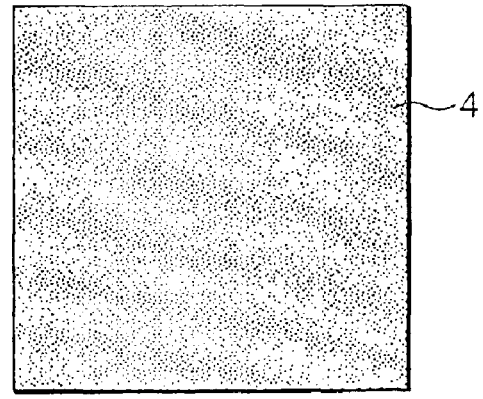
Figure 10E:
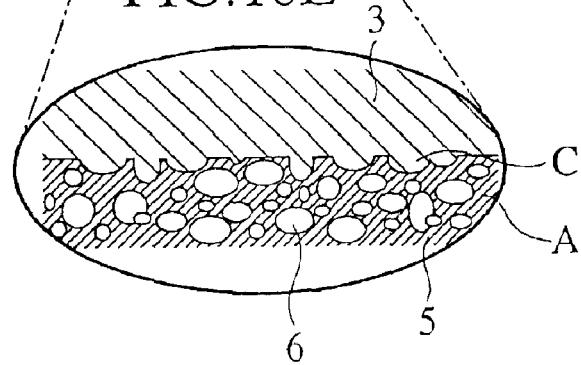

FIGS. 9A, 9C, 9E, 10A and 10C are cross sectional views principally showing a cell portion 7 of an SOFC cell plate structure 100 for sequentially illustrating a fabrication process of the manufacturing method of the SOFC cell plate structure of the presently filed preferred embodiment, FIG. 10E is an enlarged view of a part of FIG. 10C and FIGS. 9B, 9D, 9F, 10B and 10D are plan views corresponding to FIGS. 9A, 9C, 9E, 10A and 10C, respectively.

First, as shown in FIGS. 9A and 9B, silicon nitride is deposited on both surfaces of a silicon substrate 1 each in a film with a thickness in the order of approximately 2000 Å by a reduced pressure CVD method, thereby forming an insulation layer 2 on the front surface while forming a mask layer 8 on the rear surface to subsequently allow a silicon etching step to be carried out as will be described later. Subsequently, by applying a photo-lithography method and a chemical dry etching method using $CF_4$ and $O_2$, a desired area of the silicon nitride film formed on the rear surface of the silicon substrate 1 is exposed to light and, then, the exposed area is removed, thereby forming the mask layer 8 in a desired pattern.

Subsequently, as shown in FIGS. 9C and 9D, the front surface of the silicon substrate 1 is formed with the cermet of YSZ-NiO with a thickness in the order of approximately 500 nm by an RF sputtering method, thereby forming a lower electrode layer 5. During such operation, adding silicon in the target to be sputter deposited allows the lower electrode layer 5 to be formed in a film that contains silicon particles 13.

Next, as shown in FIGS. 9E and 9F, the silicon etching step using hydrazine as silicon etching liquid is conducted at the rear surface side of the silicone substrate 1 at a temperature of approximately 80° C., thereby forming a substrate opening portion 9 while, at the same time, removing the silicon particles contained in the lower electrode layer 5 by etching the same to form the pores 6. At the same time, further, as shown in FIG. 10E, an irregular surface C is formed in an extremely minute concavity and convexity, as to an portion to be a surface an electrolyte layer 3 at the lower electrode layer 5 side.

Subsequently, as shown in FIGS. 10A and 10B, the electrolyte layer 3 composed of YSZ is formed in a film on the lower electrode layer 5 and has a thickness of approximately 2 μm by an RF sputtering method while, consecutively, a film of LSC is formed on the electrolyte layer 3 as an upper electrode layer 4 with a thickness of approximately 500 nm by an RF sputtering method. As such, the surface side of the silicon substrate 1 is formed with the diaphragm composed of the insulation layer 2, the lower electrode layer 5, the electrolyte layer 3 and the upper electrode layer 4.

Next, as shown in FIGS. 10C and 10D, a chemical dry etching method using $CF_4$ and $O_2$ is conducted at the rear surface of the silicone substrate 1, thereby removing the silicon nitride film, that forms parts of the insulation layer 2 and the mask layer 8, from the rear surface of the diaphragm portion. When this takes place, the lower electrode layer 5 is internally rendered porous such that the pores 6 are present, and the SOFC cell plate structure 100 is formed with cell portions 7 each with a structure composed of three layers involving the lower electrode layer 5, the electrolyte layer 3 and the upper electrode layer 4 which are sequentially laminated on the front surface of the silicon substrate 1.

Using the SOFC cell plate structure 100 obtained in such a way discussed above, an SOFC (unit cell) is prepared in the same manner as the first preferred embodiment to conduct evaluation of the electric power generating efficiency, with a similar result being obtained.

With such a structure of the presently filed preferred embodiment discussed above, the presence of the lower electrode layer 5 preliminarily containing silicon to be subsequently removed during the silicon etching step of the silicon substrate 1 provides a capability of forming the pores 6 in the lower electrode layer 5 to render the same to be porous, prior to the formation of the electrolyte layer 3, at the same time that the silicon substrate 1 is etched and, in addition, as shown in FIG. 10E, the electrolyte layer 3 resultantly has the surface, facing the lower electrode layer 5, formed with the irregular surface C configured in the extremely minute concavity and convexity, resulting in a further increased reaction interface thereby enabling the electric power generating efficiency to be further improved. It is noted that since the irregular surface C is formed in the extremely minute concavity and convexity, the film quality of the electrolyte layer 3 is not substantially influenced.

Also, while, in the fourth preferred embodiment, silicon is used as the substance to be contained in the lower electrode layer 5, of course, the present invention is not limited to such a substance and may utilize other substances that are dissolved with the silicon etching liquid.

In addition, although an additional step is required separately from the etching step, it is of course to be understood that the combination of the post-treatment and the substance to be contained in the same manner as in the first preferred embodiment provides an alternative way of forming the pores 6.

Moreover, using the intrusion substance whose crystalline grows up due to a heat treatment allows the crystalline particles to be grown up once upon the heat treatment at an appropriate condition prior to a post-treatment and, subsequently, the post-treatment may be conducted so as to form the pores 6 in varying sizes.

(Fifth Preferred Embodiment)

Now, an SOFC cell plate structure, its related manufacturing method, an SOFC using such an SOFC cell plate structure and its related manufacturing method of a fifth preferred embodiment according to the present invention are described below in order with reference to FIGS. 11A to 12E.

Fundamentally, the fifth preferred embodiment has the same structure as the fourth preferred embodiment with the exception that the pores 6 are formed not only on the lower electrode layer 5 but also on the upper electrode layer 4 and that the lower electrode layer 5 and the upper electrode layer 4 are arranged to contain different substances. Consequently, the fifth preferred embodiment is described below in a suitably simplified manner with such differential points being focused, with like component parts bearing the same reference numerals as those used in the fourth preferred embodiment.

Figure 12A:
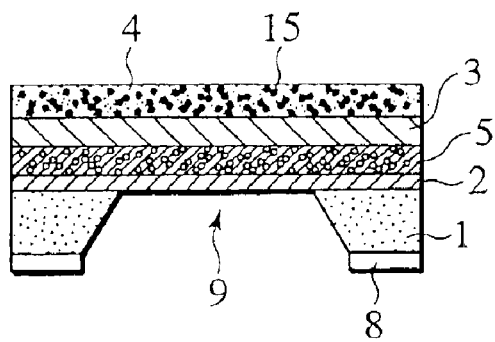
Figure 12B:
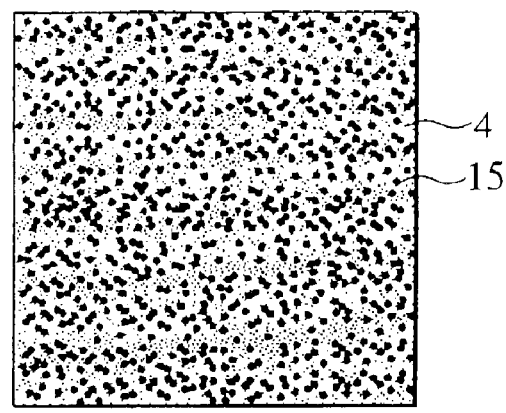
Figure 12C:
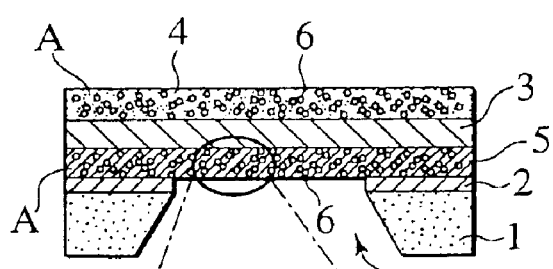
Figure 12D:
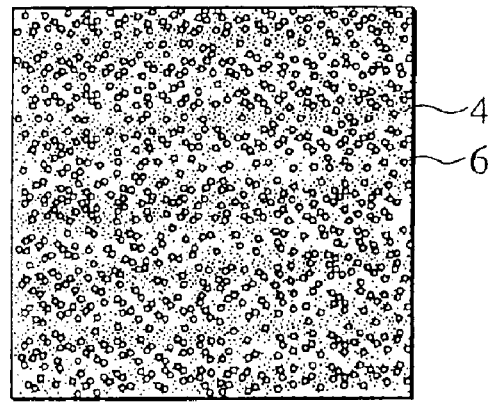
Figure 12E:
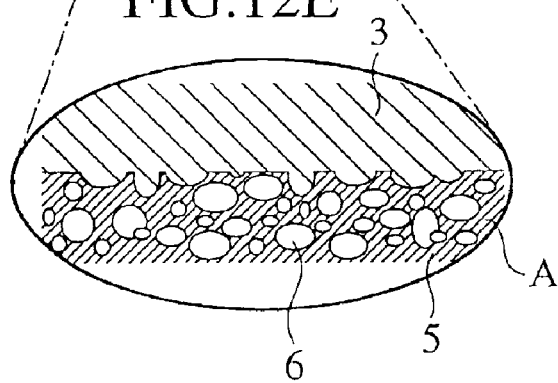
FIG. 12E is an enlarged view of a part of FIG. 12C, and FIGS. 11B, 11D, 11F, 12B and 12D are plan views corresponding to FIGS. 11A, 11C, 11E, 12A and 12C, respectively.

FIGS. 11A, 11C, 11E, 12A and 12C are cross sectional views principally showing a cell portion 7 of an SOFC cell plate structure 100 for sequentially illustrating a fabrication process of the manufacturing method of the SOFC cell plate structure of the presently filed preferred embodiment, FIG. 12E is an enlarged view of a part of FIG. 12C and FIGS. 11B, 11D, 11F, 12B and 12D are plan views corresponding to FIGS. 11A, 11C, 11E, 12A and 12C, respectively.

First, as shown in FIGS. 11A and 11B, both surfaces of a silicon substrate 1 are formed with silicon nitride films, respectively, each with a thickness in the order of approximately 2000 Å by a reduced pressure CVD method, thereby forming an insulation layer 2 on the surface side while forming a mask layer 8 on the rear surface side and, subsequently, by applying a photo-lithography method and a chemical dry etching method using $CF_4$ and $O_2$, a desired area of the silicon nitride film formed on the rear surface of the silicon substrate 1 is exposed to light whereupon the exposed area is removed, thereby forming the mask layer 8.

Subsequently, as shown in FIGS. 11C and 11D, the front surface of the silicon substrate 1 is formed with the cermet of YSZ-NiO with a thickness in the order of approximately 500 nm by an RF sputtering method, thereby forming a lower electrode layer 5. During such operation, adding silicon in the target to be sputter deposited allows the lower electrode layer 5 to be formed in a film that contains silicon particles 14.

Next, as shown in FIGS. 11E and 11F, a silicon etching step using hydrazine as silicon etching liquid is conducted at the rear surface side of the silicone substrate 1 at a temperature of approximately 80° C., thereby forming a substrate opening portion 9 at the rear surface of the silicon substrate 1 while, at the same time, removing the silicon particles contained in the lower electrode layer 5 by etching the same to form the pores 6. At the same time, further, as shown in FIG. 12E, an irregular surface C is formed in the form of the extremely minute concavity and convexity as to an portion to be a surface an electrolyte layer 3 at the lower electrode layer 5 side.

Subsequently, as shown in FIGS. 12A and 12B, the electrolyte layer 3 composed of YSZ is formed on the lower electrode layer 5 in a film with a thickness of approximately 2 μm by an RF sputtering method while, in next step, a film of LSC is formed on the electrolyte layer 3 as an upper electrode layer 4 with a thickness of approximately 500 nm by an RF sputtering method. During such sputtering operation, silicon nitride is added in the target to be sputter deposited such that the upper electrode layer 4 formed in the film contains silicon nitride particles 15. As such, the surface side of the silicon substrate 1 is formed with the diaphragm composed of the insulation layer 2, the lower electrode layer 5, the electrolyte layer 3 and the upper electrode layer 4.

And, as shown in FIGS. 12C and 12D, a chemical dry etching method using $CF_4$ and $O_2$ is conducted at the rear surface of the silicon substrate 1, thereby removing the silicon nitride film, that forms parts of the insulation layer 2 and the mask layer 8, from the rear surface of the diaphragm portion while, at the same time, removing silicon nitride from the upper electrode layer 4 to form the pores 6 in the upper electrode layer 4. Here, the upper electrode layer 4 and the lower electrode layer 5 are internally rendered porous such that the pores 6 are present, and the SOFC cell plate structure 100 is formed with the cell portions 7 each with a structure composed of three layers involving the lower electrode layer 5, the electrolyte layer 3 and the upper electrode layer 4 which are sequentially laminated on the front surface of the silicon substrate 1.

Using the SOFC cell plate structure 100 obtained in such a way discussed above, an SOFC (unit cell) is prepared in the same manner as the first preferred embodiment to conduct evaluation of the electric power generating efficiency, with a similar result being obtained.

According to a structure of the presently filed preferred embodiment discussed above, although the lower electrode layer 5 and the upper electrode layer 4 are arranged to contain different substances that are removed in different steps, respectively, like in the fourth preferred embodiment, as shown in FIG. 12E, the electrolyte layer 3 has the surface, facing the lower electrode layer 5, formed with the irregular surface C in the form of the extremely minute concavity and convexity to provide a further increased reaction interface while, additionally, forming the pores 6 in the upper electrode layer 4 and the lower electrode layer 5 such that the upper electrode layer 4 and the lower electrode layer 5 become porous, thereby allowing gases to be desirably supplied to the reaction interfaces for enabling the electric power generating efficiency to be further improved.

Also, while, in the fifth preferred embodiment, silicon is used as the substance to be contained in the lower electrode layer 5, of course, the present invention is not limited to such a substance and may utilize other substances that are dissolved with the silicon etching liquid. Further, although the substance to be contained in the upper electrode layer 4 is composed of silicon nitride, the substance may be composed of material that can be removed by the chemical dry etching method using $CF_4$ and $O_2$.

In addition, although an additional step is required separately from the etching step, it is of course to be understood that the combination of the post-treatment and the substance to be contained in the same manner as in the first preferred embodiment provides an alternative way of forming the pores 6.

Moreover, in case of using the intrusion substance whose crystalline grows up due to a heat treatment, the crystalline particles may be grown up once upon the heat treatment at an appropriate condition prior to a post-treatment and, subsequently, the post-treatment may be conducted so as to form the pores 6 in varying sizes.

(Sixth Preferred Embodiment)

Now, an SOFC cell plate structure, its related manufacturing method, an SOFC using such an SOFC cell plate structure and its related manufacturing method of a sixth preferred embodiment according to the present invention are described below in order with reference to FIGS. 13A to 13D.

Fundamentally, the sixth preferred embodiment has the same structure as the fifth preferred embodiment with the exception that material to be contained during the formation of the lower electrode layer 5 is composed of two kinds of substances including silicon which can be dissolved and removed during a silicon etching step and silicon nitride which can be gasified and removed by plasma composed of $CF_4$ and $O_2$ to remove the silicon nitride film. Consequently, the sixth preferred embodiment is described below in a suitably simplified manner with such differential points being focused, with like component parts bearing the same reference numerals as those used in the fifth preferred embodiment.

FIGS. 13A to 13D are cross sectional views principally showing a cell portion 7 of an SOFC cell plate structure 100 for sequentially illustrating a fabrication process of the manufacturing method of the SOFC cell plate structure of the presently filed preferred embodiment.

First, like in the fifth preferred embodiment, both surfaces of a silicon substrate 1 are formed with silicon nitride films, respectively, thereby forming an insulation layer 2 on the front surface while forming a mask layer 8 on the rear surface by conducting a silicon etching step to remove the desired area of the silicon nitride from the rear surface of the silicon substrate 1.

Figure 13A:
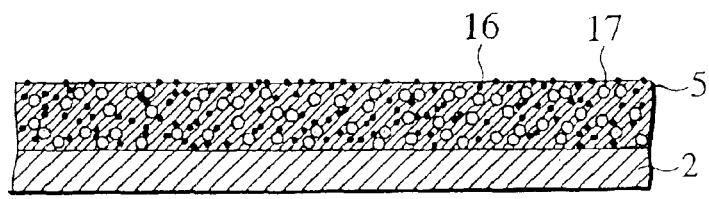
FIGS. 13A to 13D are cross sectional views showing a cell portion of an SOFC cell plate structure of a sixth preferred embodiment according to the present invention in an enlarged scale for sequentially illustrating a fabrication process of a related method for manufacturing the SOFC cell plate structure.

Subsequently, as shown in FIG. 13A, the front surface of the silicon substrate 1 is formed with the cermet of YSZ—NiO with a thickness in the order of approximately 500 nm by an RF sputtering method, thereby forming a lower electrode layer 5. During such sputtering operation, adding silicon and silicon nitride in the target to be sputter deposited allows the resulting lower electrode layer 5 formed in the film to contain silicon particles 16 and silicon nitride particles 17.

Figure 13B:
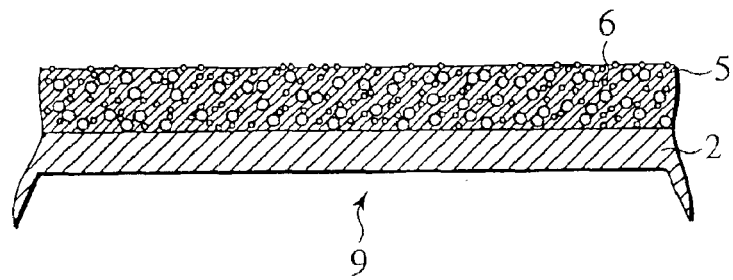

Next, as shown in FIG. 13B, the silicon etching step using hydrazine as silicon etching liquid is conducted at the rear surface side of the silicone substrate 1 at a temperature of approximately 80° C., thereby forming a substrate opening portion 9 at the rear surface of the silicon substrate 1 while, at the same time, removing the silicon particles contained in the lower electrode layer 5 by etching the same to form the pores 6 corresponding to the silicon particles 16.

Figure 13C:
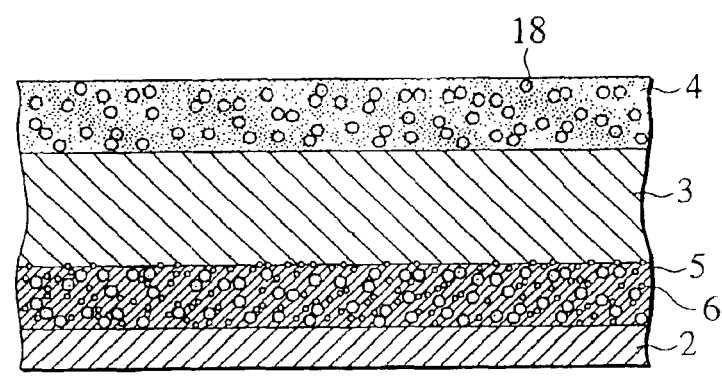

Subsequently, as shown in FIG. 13C, an electrolyte layer 3 composed of YSZ is formed on the lower electrode layer 5 in a film with a thickness of approximately 2 $\mu$m by an RF sputtering method while, in next step, a film of LSC is formed on the electrolyte layer 3 as an upper electrode layer 4 with a thickness of approximately 500 nm by an RF sputtering method. During such sputtering operation, silicon nitride is added in the target to be sputter deposited such that the upper electrode layer 4 formed in the film to contain silicon nitride particles 18. As such, the surface side of the silicon substrate 1 is formed with the diaphragm composed of the insulation layer 2, the lower electrode layer 5, the electrolyte layer 3 and the upper electrode layer 4.

Figure 13D:
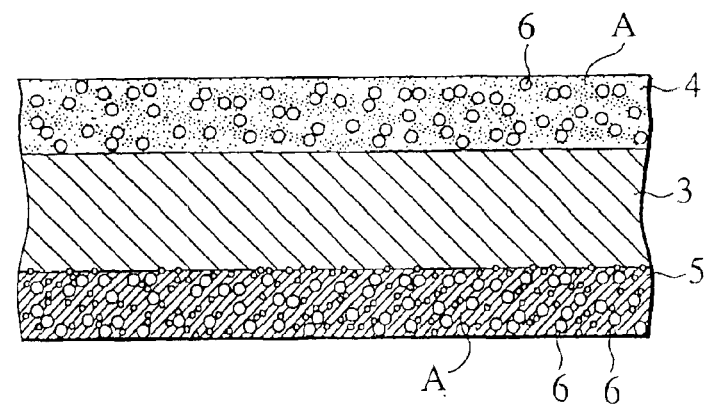

And, as shown in FIG. 13D, a chemical dry etching method using $CF_4$ and $O_2$ is conducted at the rear surface of the silicone substrate 1, thereby removing the silicon nitride film, that forms parts of the insulation layer 2 and the mask layer 8, from the rear surface of the diaphragm portion composed of the insulation layer 2, the lower electrode layer 5, the electrolyte layer 3 and the upper electrode layer 4 while, at the same time, removing the silicon nitride particles 18 from the upper electrode layer 4 and the silicon nitride particles 17 from the lower electrode layer 5. Thus, the pores 6 are correspondingly formed in the upper electrode layer 4 and the lower electrode layer 5. Here, the upper electrode layer 4 and the lower electrode layer 5 are internally rendered porous such that the pores 6 are present, and the SOFC cell plate structure 100 is formed with cell portions 7 each with a structure composed of three layers involving the lower electrode layer 5, the electrolyte layer 3 and the upper electrode layer 4 which are sequentially laminated on the front surface of the silicon substrate 1.

Using the SOFC cell plate structure 100 obtained in such a way discussed above, an SOFC (unit cell) is prepared in the same manner as the first preferred embodiment to conduct evaluation of the electric power generating efficiency, with a similar result being obtained.

According to a structure of the presently filed preferred embodiment discussed above, the presence of two kinds of inclusions in the lower electrode layer 5 that forms a backing layer of the electrolyte layer 3 allows the pores 6 to be formed at the surface of the lower electrode facing the electrolyte layer 3 to a limited extent to preclude the formation of the electrolyte layer 3 from being adversely affected whereupon, after the formation of the electrolyte layer 3 has been completed, the post-treatment is conducted to further form the pores 6, resulting in a remarkable increase in a surface area of the reaction interface while enabling the gas to be sufficiently supplied to the reaction interface. As a consequence, the use of such combination of plural inclusions and the post-treatment provides a capability of controlling the porous degrees to be required during execution of the process for the upper electrode layer 4 and the lower electrode layer 5 to respective optimum levels.

(Seventh Preferred Embodiment)

Now, an SOFC cell plate structure, its related manufacturing method, an SOFC using such an SOFC cell plate structure and its related manufacturing method of a seventh preferred embodiment according to the present invention are described below in order with reference to FIG. 14.

Fundamentally, the seventh preferred embodiment has the same structure as the first preferred embodiment with the exception that each of the upper electrode layer 4 and the lower electrode layer 5 has a more heavily dense porous degree at a gas stream side than that at the side of the electrolyte layer 3. Consequently, the seventh preferred embodiment is described below in a suitably simplified manner with such a differential point being focused, with like component parts bearing the same reference numerals as those used in the first preferred embodiment.

Figure 14:
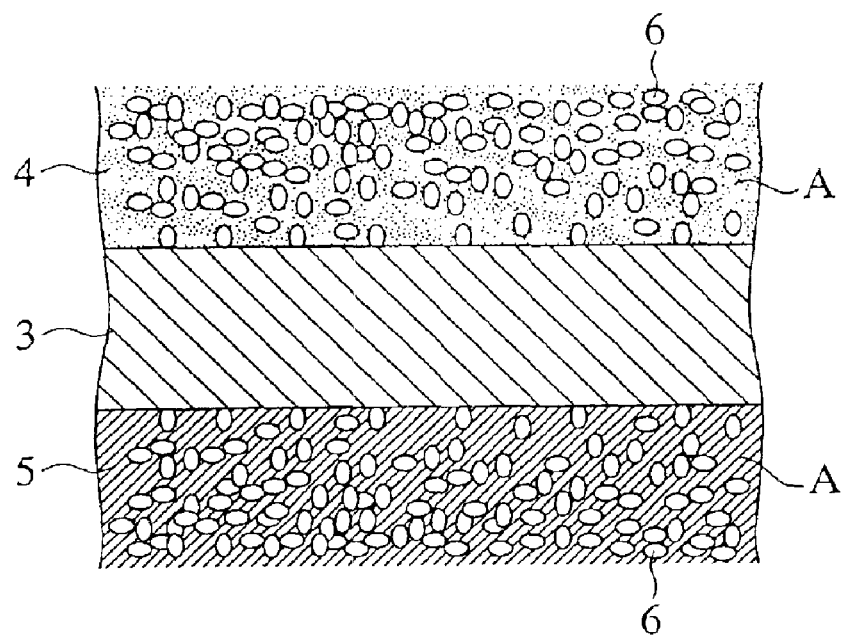
FIG. 14 is a cross sectional view illustrating an SOFC cell plate structure of a seventh preferred embodiment according to the present invention, with an electrolyte layer, an upper electrode layer and a lower electrode layer between which the electrolyte layer is caught being shown in an enlarged scale.

FIG. 14 is a cross sectional view illustrating the electrolyte layer 3, the upper electrode layer 4 and the lower electrode layer 5, between which the electrolyte layer 3 is caught, of the SOFC cell plate structure 100 of the seventh preferred embodiment.

In FIG. 14, when forming the upper electrode layer 4 and the lower electrode layer 5, co-sputtering is conducted at respective film forming rates to form such layers with respective associated electrode materials and respective inclusion substances to be contained in the upper electrode layer 4 and the lower electrode layer 5. In particular, during formation of the upper electrode layer 4, the upper electrode layer 4 is formed by conducting the sputtering step in which the sputtering rate of the substance to be contained in the upper electrode layer 4 is accelerated from the electrolyte layer 3 side toward the gas stream side, i.e. an upper side as viewed in FIG. 14, to be higher than that of the electrode material of the upper electrode layer 4 such that the composition ratio of the substance particles has a gradient which continuously increases from the electrolyte layer 3 side toward the gas stream side. Thus, the upper electrode layer 4 has a higher porous degree in the area near the gas stream side than that of the area near the electrolyte layer 3 side. Likewise, during formation of the lower electrode layer 5, the lower electrode layer 5 is formed by conducting the sputtering step in which the sputtering rate of the substance to be contained in the lower electrode layer 5 is accelerated from the electrolyte layer 3 side toward the gas stream side, i.e. a lower side as viewed in FIG. 14, to be higher than that of the electrode material of the lower electrode layer 5 such that the composition ratio of the substance particles has a gradient which continuously increases from the electrolyte layer 3 side toward the gas stream side. Thus, the lower electrode layer 5 has a higher porous degree in the area near the gas stream side than that of the area near the electrolyte layer 3 side.

According to the structure of the presently filed preferred embodiment, the upper electrode layer 4 and the lower electrode layer 5 are formed with the associated electrode materials and the associated substances by conducting the sputtering steps at their respective film forming rates so as to provide the gradients in the inclusion ratios of the substances to be contained in the upper electrode layer 4 and the lower electrode layer 5 such that each inclusion ratio increases from the electrolyte layer 3 side toward the gas stream side in the respective compositions. Thus, each electrode layer has a porous degree that is higher in the area near the gas stream side than that in the area near the electrolyte layer 3 side. This results in a remarkable increase in the surface areas of the reaction interfaces as to the upper electrode layer 4, the electrolyte layer 3 and the lower electrode layer 5, enabling gases to be sufficiently and accurately supplied to the reaction interfaces.

Further, while the presently filed preferred embodiment has been described above as using the co-sputtering method, other techniques may also be employed provided that these techniques allow films to be formed with a plurality of materials at independent film forming rates. Furthermore, the use of the plural targets with different ratios of the electrode material and the substance to be included enables the sputtering operations to be conducted to vary the porous degrees, step by step (stepwise).

Incidentally in the present embodiment, it is needless to say that the porous degrees of the upper electrode layer 4 and the lower electrode layer 5 may be varied not only in a continuous manner but also stepwise.

(Eighth Preferred Embodiment)

Now, an SOFC cell plate structure, its related manufacturing method, an SOFC using such an SOFC cell plate structure and its related manufacturing method of an eighth preferred embodiment according to the present invention are described below in order with reference to FIG. 15.

Fundamentally, the eleventh preferred embodiment has the same structure as the first preferred embodiment with the exception that each of the upper electrode layer 4 and the lower electrode layer 5 has a more heavily dense porous degree at an area near the gas stream side than that of another area near the electrolyte layer 3 side. Consequently, the eleventh preferred embodiment is described below in a suitably simplified manner with such a differential point being focused, with like component parts bearing the same reference numerals as those used in the first preferred embodiment.

Figure 15:
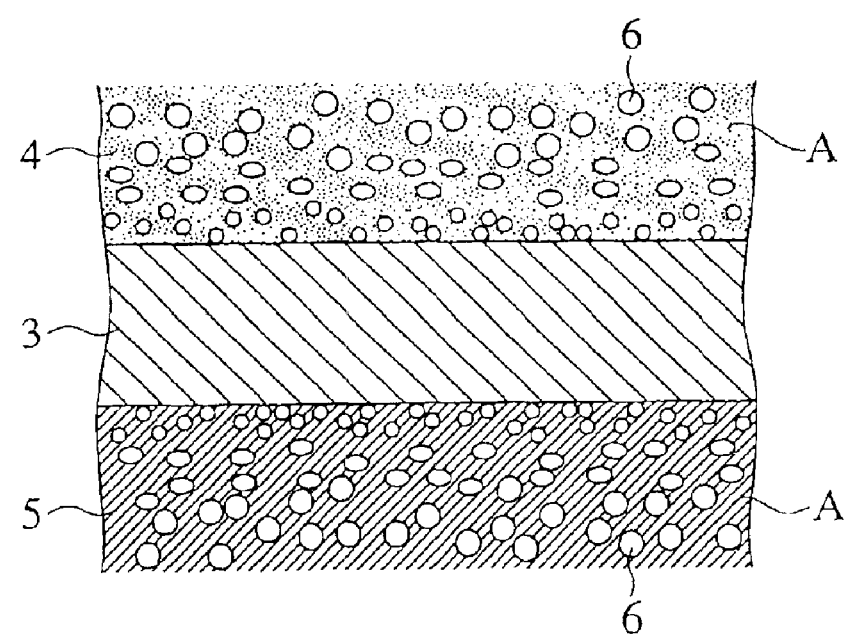
FIG. 15 is a cross sectional view illustrating an SOFC cell plate structure of an eighth preferred embodiment according to the present invention, with an electrolyte layer, an upper electrode layer and a lower electrode layer between which the electrolyte layer is caught being shown in an enlarged scale.

FIG. 15 is a cross sectional view illustrating the electrolyte layer 3, the upper electrode layer 4 and the lower electrode layer 5, between which the electrolyte layer 3 is caught, of the SOFC cell plate structure 100 of the seventh preferred embodiment.

In FIG. 15, when forming each of the upper electrode layer 4 and the lower electrode layer 5 by conducting sputtering operations to form the respective films with the respective electrode materials or the like, the amount of electric power required for each of the sputtering operations is continuously varied at a higher rate in an area closer to the gas stream side than that in another area closer to the electrolyte layer side. In particular, when forming the upper electrode layer 4, the sputtering step is conducted so as to allow the upper electrode layer 4 to contain the substance with a crystalline size increasing from the electrolyte layer 3 side toward the gas stream side, i.e. an upper side as viewed in FIG. 15, such that the upper electrode layer 4 has a higher porous degree in the area near the gas stream side than that of the electrolyte layer 3 side. Likewise, when forming the lower electrode layer 5, the sputtering step is conducted so as to allow the lower electrode layer 5 to contain the substance with a crystalline size increasing from the electrolyte layer 3 side toward the gas stream side, i.e. a lower side as viewed in FIG. 15, such that the lower electrode layer 5 has a higher porous degree in the area near the gas stream side than that of the area near the electrolyte layer 3 side.

According to the structure of the presently filed preferred embodiment, since, when forming the upper electrode layer 4 and the lower electrode layer 5, the amount of electric power required for each of the sputtering operations is continuously controlled at varying rates to cause the substance, contained in each of the electrode layers, to have a larger crystalline size in the area near the gas stream side than that of the area near the electrolyte layer 3 side such that the porous degree becomes higher in the area near the gas stream side than that in the area near the electrolyte layer 3 side. Thus, the surface areas of the reaction interfaces as to the upper electrode layer 4, electrolyte layer 3 and the lower electrode layer 5 are remarkably increased, enabling gases to be sufficiently and accurately supplied to the reaction interfaces.

Further, while the presently filed preferred embodiment has been discussed as applied with the technique for varying the electric power output required for the sputtering operation, of course, the present invention is not limited thereto and it may be possible to alter the sputtering condition such as a vacuum level. Furthermore, it may be of course possible to apply other film forming techniques than the sputtering method.

Incidentally in the present embodiment, the porous degrees of the upper electrode layer 4 and the lower electrode layer 5 may be varied not only in a continuous manner but also stepwise.

In addition in the above mentioned preferred embodiments, a plurality of steps may be conducted to resultantly form the entire lower electrode layer 5 provided with the pores 6 such that a first part of the lower electrode layer 5 is formed with a predetermined thickness and its corresponding post-treatment is sequentially executed, a second part of the lower electrode layer 5 is formed with a predetermined thickness thereon and its corresponding post-treatment is sequentially executed, and so on. That is, a step which forms the lower electrode layer 5 may include a plurality of steps each of which forms a part of the lower electrode layer 5, and the post-treatment may correspondingly include a plurality of steps. Of course, such a plurality of steps may be similarly applied to the upper electrode layer 4, too.

The entire content of a Patent Application No. TOKUGAN 2001-245721 with a filing date of Aug. 13, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A method of manufacturing a cell plate structure for a solid oxide electrolyte type fuel cell, comprising:

forming a lower electrode layer;

forming an upper electrode layer, the upper electrode layer being provided in opposition to the lower electrode layer;

forming a solid electrolyte layer, which is provided between the lower electrode layer and the upper electrode layer;

allowing a substance to be contained in at least one of the lower electrode layer and the upper electrode layer; and executing a post-treatment by removing the substance, contained in the at least one of the lower electrode layer and the upper electrode layer during formation thereof, after the at least one of the lower electrode layer and the upper electrode layer has been formed, to make the at least one of the lower electrode layer and the upper electrode layer porous, the substance being removed from the at least one of the formed lower electrode layer and the formed upper electrode layer while leaving the at least one of the formed lower electrode layer and the formed upper electrode layer.

2. The method according to claim 1, wherein the post-treatment is executed after the solid electrolyte layer has been formed for thereby making the at least one of the lower electrode layer and the upper electrode layer porous.

3. The method according to claim 1, wherein the post-treatment is executed before the solid electrolyte layer has been formed for thereby making the at least one of the lower electrode layer and the upper electrode layer porous.

4. The method according to claim 1, wherein a heat treatment is conducted during the post-treatment after the at least one of the lower electrode layer and the upper electrode layer has been formed.

5. The method according to claim 1, wherein the substance contained in the at least one of the lower electrode layer and the upper electrode layer during formation thereof is composed of a material to be gasified by oxidization, and the post-treatment includes a heat treatment to be conducted in an oxidizing atmosphere.

6. The method according to claim 5, wherein the substance contained in the at least one of the lower electrode layer and the upper electrode layer during formation thereof is composed of at least one element selected from molybdenum, molybdenum compound, tungsten, tungsten compound and carbon.

7. The method according to claim 1, wherein the substance contained in the at least one of the lower electrode layer and the upper electrode layer during formation thereof is composed of a material to be gasified by a plasma treatment, and the post-treatment includes a plasma treatment.

8. The method according to claim 7, wherein the substance contained in the at least of the lower electrode layer and the upper electrode layer during formation thereof is composed of at least one element selected from silicon, silicon nitride, silicon oxide, molybdenum silicide, tungsten silicide, titanium, titanium nitride and titanium oxide.

9. The method according to claim 1, wherein the substance contained in the at least one of the lower electrode layer and the upper electrode layer during formation thereof is composed of a material to be dissolved by conducting a treatment with a chemical liquid, and the post-treatment includes the treatment with the chemical liquid.

10. The method according to claim 9, wherein the substance contained in the at least one of the lower electrode layer and the upper electrode layer during formation thereof is composed of silicon oxide, and the chemical liquid to be used in the treatment with the chemical liquid includes a hydrogen fluoride solution.

11. The method according to claim 9, wherein the substance contained in the at least one of the lower electrode layer and the upper electrode layer during formation thereof is composed of silicon, and the chemical liquid to be used in the treatment with the chemical liquid includes a strong alkaline solution.

12. The method according to claim 1, wherein the substance contained in the at least one of the lower electrode layer and the upper electrode layer during formation thereof is composed of a plurality of kinds of materials, and the post-treatment includes a plurality of kinds of treatments.

13. The method according to claim 1, wherein an amount of inclusion of the substance contained in the at least one of the lower electrode layer and the upper electrode layer during formation thereof is stepwise or continuously varied.

14. The method according to claim 1, wherein a particle size of the substance contained in the at least one of the lower electrode layer and the upper electrode layer during formation thereof is stepwise or continuously varied.

15. The method according to claim 1, wherein a heat treatment is conducted prior to the post-treatment and after the at least one of the lower electrode layer and the upper electrode layer has been formed.

16. The method according to claim 1, wherein a step which forms the at least one of the lower electrode layer and the upper electrode layer includes a plurality of steps each of which forms a part of the at least one of the lower electrode layer and the upper electrode layer with a predetermined thickness, and the post-treatment correspondingly includes a plurality of steps.

17. The method according to claim 1, wherein the substance is contained in the at least one of the lower electrode layer and the upper electrode layer as particles to make the at least one of the lower electrode layer and the upper electrode layer porous, and the at least one of the lower electrode layer and the upper electrode layer is in contact with the solid electrolyte layer.

* * * * *